(12) United States Patent
Brown Elliott et al.

(10) Patent No.: US 7,084,923 B2
(45) Date of Patent: Aug. 1, 2006

(54) DISPLAY SYSTEM HAVING IMPROVED MULTIPLE MODES FOR DISPLAYING IMAGE DATA FROM MULTIPLE INPUT SOURCE FORMATS

(75) Inventors: Candice Hellen Brown Elliott, Vallejo, CA (US); Michael Francis Higgins, Cazadaro, CA (US); Seok Jin Han, Cupertino, CA (US); Thomas Lloyd Credelle, Morgan Hill, CA (US)

(73) Assignee: Clairvoyante, Inc, Sebastopol, CA (US)

( * ) Notice: Subject to any disclaimer, the term of this patent is extended or adjusted under 35 U.S.C. 154(b) by 0 days.

(21) Appl. No.: 10/696,235

(22) Filed: Oct. 28, 2003

(65) Prior Publication Data

US 2005/0099540 A1   May 12, 2005

(51) Int. Cl.
*H04N 7/01* (2006.01)

(52) U.S. Cl. ............... 348/441; 348/554; 348/348; 348/581

(58) Field of Classification Search ............... 348/441, 348/458, 459, 452, 554, 555, 581; 345/603, 345/660, 667–669, 698, 699
See application file for complete search history.

(56) References Cited

U.S. PATENT DOCUMENTS

| | | |
|---|---|---|
| 3,971,065 A | 7/1976 | Bayer |
| 4,353,062 A | 10/1982 | Lorteije et al. |
| 4,642,619 A | 2/1987 | Togashi |
| 4,651,148 A | 3/1987 | Takeda et al. |
| 4,737,843 A | 4/1988 | Spencer |
| 4,751,535 A | 6/1988 | Myers |
| 4,773,737 A | 9/1988 | Yokono et al. |
| 4,800,375 A | 1/1989 | Silverstein et al. |
| 4,853,592 A | 8/1989 | Strathman |
| 4,874,986 A | 10/1989 | Menn et al. |
| 4,886,343 A | 12/1989 | Johnson |
| 4,920,409 A | 4/1990 | Yamagishi |
| 4,946,259 A | 8/1990 | Matino et al. |
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,010,413 A * | 4/1991 | Bahr ..................... 348/383 |
| 5,052,785 A | 10/1991 | Takimoto et al. |
| 5,062,057 A * | 10/1991 | Blacken et al. ............. 345/567 |

(Continued)

FOREIGN PATENT DOCUMENTS

DE   299 09 537 U1   10/1999

(Continued)

OTHER PUBLICATIONS

Adobe Systems, Inc. website, http://www.adobe.com/products/acrobat/cooltype.html.

(Continued)

*Primary Examiner*—Victor R. Kostak

(57) ABSTRACT

Systems and methods are herein given to effect a multiple mode display system that may accept multiple input image data formats and output several possible image data format. In a first embodiment, an image processing system comprises: an input that receives a plurality of source image data, said plurality of source image data further comprising a plurality of source image data formats; circuitry that resamples source image data from said source image data format to a plurality of target image data formats; and a display that renders target image data wherein the resolution of the display comprises approximately one half resolution of the largest of said plurality of target image data formats.

13 Claims, 34 Drawing Sheets

U.S. PATENT DOCUMENTS

| | | |
|---|---|---|
| 5,113,274 A | 5/1992 | Takahashi et al. |
| 5,132,674 A | 7/1992 | Balcken et al. |
| 5,196,924 A | 3/1993 | Lumelsky et al. |
| 5,227,863 A * | 7/1993 | Bilbrey et al. ............... 348/578 |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,416,890 A | 5/1995 | Beretta |
| 5,436,747 A | 7/1995 | Suzuki |
| 5,438,649 A | 8/1995 | Ruetz |
| 5,448,652 A | 9/1995 | Vaidyanathan et al. |
| 5,450,216 A | 9/1995 | Kasson |
| 5,461,503 A | 10/1995 | Deffontaines et al. |
| 5,477,240 A | 12/1995 | Huebner et al. |
| 5,485,293 A | 1/1996 | Robinder |
| 5,541,653 A | 7/1996 | Peters et al. |
| 5,563,621 A | 10/1996 | Silsby |
| 5,579,027 A | 11/1996 | Sakurai et al. |
| 5,642,176 A | 6/1997 | Abukawa et al. |
| 5,724,442 A | 3/1998 | Ogatsu et al. |
| 5,739,802 A | 4/1998 | Mosier |
| 5,754,163 A | 5/1998 | Kwon |
| 5,754,226 A | 5/1998 | Yamada et al. |
| 5,815,101 A | 9/1998 | Fonte |
| 5,821,913 A | 10/1998 | Mamiya |
| 5,880,707 A | 3/1999 | Aratani |
| 5,899,550 A | 5/1999 | Masaki |
| 5,903,366 A | 5/1999 | Hirabayashi et al. |
| 5,917,556 A | 6/1999 | Katayama |
| 5,929,843 A | 7/1999 | Tanioka |
| 5,933,253 A | 8/1999 | Ito et al. |
| 5,949,496 A | 9/1999 | Kim |
| 5,973,664 A | 10/1999 | Badger |
| 6,002,446 A | 12/1999 | Eglit |
| 6,005,582 A | 12/1999 | Gabriel et al. |
| 6,008,868 A | 12/1999 | Silverbrook |
| 6,034,666 A | 3/2000 | Kanai et al. |
| 6,038,031 A | 3/2000 | Murphy |
| 6,049,626 A | 4/2000 | Kim |
| 6,054,832 A | 4/2000 | Kunzman et al. |
| 6,061,533 A | 5/2000 | Kajiwara |
| 6,069,670 A | 5/2000 | Borer |
| 6,097,367 A | 8/2000 | Kuriwaki et al. |
| 6,100,872 A | 8/2000 | Aratani et al. |
| 6,108,122 A | 8/2000 | Ulrich et al. |
| 6,144,352 A | 11/2000 | Matsuda et al. |
| 6,151,001 A | 11/2000 | Anderson et al. |
| 6,160,535 A | 12/2000 | Park |
| 6,184,903 B1 | 2/2001 | Omori |
| 6,188,385 B1 | 2/2001 | Hill et al. |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock et al. |
| 6,239,783 B1 | 5/2001 | Hill et al. |
| 6,243,055 B1 | 6/2001 | Fergason |
| 6,243,070 B1 | 6/2001 | Hill et al. |
| 6,262,710 B1 | 7/2001 | Smith |
| 6,271,891 B1 | 8/2001 | Ogawa et al. |
| 6,278,434 B1 | 8/2001 | Hill et al. |
| 6,297,826 B1 | 10/2001 | Semba et al. |
| 6,326,981 B1 | 12/2001 | Mori et al. |
| 6,327,008 B1 | 12/2001 | Fujiyoshi |
| 6,346,972 B1 | 2/2002 | Kim |
| 6,348,929 B1 | 2/2002 | Acharya et al. |
| 6,360,008 B1 | 3/2002 | Suzuki et al. |
| 6,360,023 B1 | 3/2002 | Betrisey et al. |
| 6,377,262 B1 | 4/2002 | Hitchcock et al. |
| 6,384,836 B1 | 5/2002 | Naylor, Jr. et al. |
| 6,393,145 B1 | 5/2002 | Betrisey et al. |
| 6,396,505 B1 | 5/2002 | Lui et al. |
| 6,414,719 B1 * | 7/2002 | Parikh ........................ 348/448 |
| 6,466,618 B1 | 10/2002 | Messing et al. |
| 6,483,518 B1 | 11/2002 | Perry et al. |
| 6,486,923 B1 | 11/2002 | Maeshima et al. |
| 6,545,653 B1 | 4/2003 | Takahara et al. |
| 6,545,740 B1 | 4/2003 | Werner |
| 6,570,584 B1 | 5/2003 | Cok et al. |
| 6,583,787 B1 | 6/2003 | Pfister et al. |
| 6,600,495 B1 | 7/2003 | Boland et al. |
| 6,624,828 B1 | 9/2003 | Dresevic et al. |
| 6,661,429 B1 | 12/2003 | Phan |
| 6,674,430 B1 | 1/2004 | Kaufman et al. |
| 6,674,436 B1 | 1/2004 | Dresevic et al. |
| 6,680,761 B1 | 1/2004 | Greene et al. |
| 6,681,053 B1 | 1/2004 | Zhu |
| 6,714,206 B1 | 3/2004 | Martin et al. |
| 6,714,212 B1 | 3/2004 | Tsuboyama et al. |
| 6,738,526 B1 | 5/2004 | Betrisey et al. |
| 6,750,875 B1 | 6/2004 | Keely, Jr. et al. |
| 6,781,626 B1 | 8/2004 | Wang |
| 6,801,220 B1 | 10/2004 | Greier et al. |
| 6,804,407 B1 | 10/2004 | Weldy |
| 6,833,890 B1 | 12/2004 | Hong et al. |
| 6,836,300 B1 | 12/2004 | Choo et al. |
| 6,850,294 B1 | 2/2005 | Roh et al. |
| 6,867,549 B1 | 3/2005 | Cok et al. |
| 6,885,380 B1 | 4/2005 | Primerano et al. |
| 6,888,604 B1 | 5/2005 | Rho et al. |
| 6,897,876 B1 | 5/2005 | Murdoch et al. |
| 6,903,378 B1 | 6/2005 | Cok |
| 2001/0048764 A1 | 12/2001 | Betrisey et al. |
| 2002/0093476 A1 | 7/2002 | Hill et al. |
| 2002/0136293 A1 * | 9/2002 | Washino ................ 375/240.01 |
| 2002/0140831 A1 | 10/2002 | Hayashi |
| 2002/0149598 A1 | 10/2002 | Greier et al. |
| 2002/0186229 A1 | 12/2002 | Brown |
| 2003/0006978 A1 | 1/2003 | Fujiyoshi |
| 2003/0071775 A1 | 4/2003 | Ohashi et al. |
| 2003/0071943 A1 | 4/2003 | Choo et al. |
| 2003/0077000 A1 | 4/2003 | Blinn et al. |
| 2003/0098928 A1 | 5/2003 | Kim |
| 2003/0184571 A1 | 10/2003 | Hirayama |
| 2003/0218618 A1 | 11/2003 | Phan |
| 2004/0008208 A1 | 1/2004 | Dresevic et al. |
| 2004/0021804 A1 | 2/2004 | Hong et al. |
| 2004/0036704 A1 | 2/2004 | Han et al. |
| 2004/0061710 A1 | 4/2004 | Messing et al. |
| 2004/0075764 A1 | 4/2004 | Law et al. |
| 2004/0085495 A1 | 5/2004 | Roh et al. |
| 2004/0095521 A1 | 5/2004 | Song et al. |
| 2004/0108818 A1 | 6/2004 | Cok et al. |
| 2004/0114046 A1 | 6/2004 | Lee et al. |
| 2004/0155895 A1 | 8/2004 | Lai |
| 2004/0169807 A1 | 9/2004 | Rho et al. |
| 2004/0179160 A1 | 9/2004 | Rhee et al. |
| 2004/0189662 A1 | 9/2004 | Frisken et al. |
| 2004/0189664 A1 | 9/2004 | Frisken et al. |
| 2004/0196297 A1 | 10/2004 | Elliott et al. |
| 2004/0213449 A1 | 10/2004 | Safee-Rad et al. |
| 2004/0239813 A1 | 12/2004 | Klompenhouwer |
| 2004/0239837 A1 | 12/2004 | Hong et al. |
| 2004/0247070 A1 | 12/2004 | Ali et al. |
| 2004/0263528 A1 | 12/2004 | Murdoch et al. |
| 2005/0007539 A1 | 1/2005 | Taguchi et al. |
| 2005/0024380 A1 | 2/2005 | Lin et al. |
| 2005/0031199 A1 | 2/2005 | Ben-Chorin et al. |
| 2005/0040760 A1 | 2/2005 | Taguchi et al. |
| 2005/0068477 A1 | 3/2005 | Shin et al. |
| 2005/0083356 A1 | 4/2005 | Roh et al. |
| 2005/0094871 A1 | 5/2005 | Berns et al. |
| 2005/0099426 A1 | 5/2005 | Primerano et al. |

| | | |
|---|---|---|
| 2005/0140634 A1 | 6/2005 | Takatori |
| 2005/0162600 A1 | 7/2005 | Rho et al. |
| 2005/0169551 A1 | 8/2005 | Messing et al. |

FOREIGN PATENT DOCUMENTS

| | | |
|---|---|---|
| DE | 199 23 527 | 11/2000 |
| DE | 201 09 354 U1 | 9/2001 |
| EP | 0 322 106 A2 | 6/1989 |
| EP | 0 793 214 A1 | 9/1997 |
| EP | 1 083 539 A2 | 3/2001 |
| EP | 1 381 020 A2 | 1/2004 |
| JP | 60-107022 | 6/1985 |
| JP | 06-102503 | 4/1994 |
| JP | 2004004822 | 1/2004 |
| WO | WO 00/42564 | 7/2000 |
| WO | WO 00/65432 | 11/2000 |
| WO | WO 00/67196 | 11/2000 |
| WO | WO 03/014819 A1 | 2/2003 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |
| WO | WO 2005/065027 A2 | 7/2005 |

OTHER PUBLICATIONS

Betrisey, C., et al., Displaced Filtering for Patterned Displays, SID Symp. Digest, 296-299, 1999.

Brown Elliott, C., "Active Matrix Display . . . ", IDMC 2000, 185-189, Aug. 2000.

Brown Elliott, C., "Color Subpixel Rendering Projectors and Flat Panel Displays," SMPTE, Feb. 27-Mar. 1, 2003, Seattle, WA pp. 1-4.

Brown Elliott, C. "Co-Optimization of Color AMLCD Subpixel Architecture and Rendering Algorithms," SID 2002 Proceedings Paper, May 30, 2002.

Brown Elliott, C, "Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002, pp. 115-117.

Brown Elliott, C, "Reducing Pixel Count Without Reducing Image Quality", Information Display Dec. 1999, vol. 1, pp. 22-25.

"ClearType magnified", Wired Magazine, Nov. 8, 1999, Microsoft Typography, article posted Nov. 8, 1999, last updated Jan. 27, 1999 1 page.

Credelle, Thomas, "P-00: MTF of High-Resolution PenTile Matrix Displays", Eurodisplay 02 Digest, 2002 pp. 1-4.

Daly, Scott, "Analysis of Subtriad Addressing Algorithms by Visual System Models", SID Symp. Digest, Jun. 2001 pp. 1200-1203.

Gibson, S., "Sub-Pixel Rendering: How it works," Gibson Research Corp., http://www.grc.com/ctwhat.html.

Johnston, Stuart, "An Easy Read: Microsoft's ClearType," InformationWeek Online, Redmond WA, Nov. 23, 1998, 3 pages.

Johnston, Stuart, "Clarifying ClearType," InformationWeek Online, Redmond WA, Jan. 4, 1999, 4 pages.

Just Outta Beta, Wired Magazine, Dec. 1999 Issue 7-12, 3 pages.

Klompenhouwer, Michiel, Subpixel Image Scaling for Color Matrix Displays, SID Symp. Digest, May 2002, pp. 176-179.

Krantz, John et al., Color Matrix Display Image Quality: The Effects of Luminance . . . SID 90 Digest, pp. 29-32.

Lee, Baek-woon et al., 40.5L: Late-News Paper: TFT-LCD with RGBW Color system, SID 03 Digest, 2003, pp. 1212-1215.

Martin, R., et al., "Detectability of Reduced Blue-Pixel Count in Projection Displays," SID Symp. Digest, May 1993, pp. 606-609.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

"Microsoft ClearType," website, Mar. 26, 2003, 4 pages.

Microsoft Corp. website, http://www.microsoft.com/typography/cleartype, 7 pages.

Murch, M., "Visual Perception Basics," SID Seminar, 1987, Tektronix Inc, Beaverton Oregon.

Okumura et al., "A New Flicker-Reduction Drive Method for High Resolution LCTVs", SID Digest, 551-554, 2001.

Platt, John, Optimal Filtering for Patterned Displays, IEEE Signal Processing Letters, 2000, 4 pages.

Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30.

Dharia, Probodh M, Non-Final Office Action, dated Jan. 28, 2005 in U.S. Appl. No. 10/696,026 (20 pages).

Kaler, Stuart P, Response to Non-Final Office Action, dated Jul. 27, 2005 in U.S. Appl. No. 10/696,026 (28 pages).

Dharia, Probodh M, Non-Final Office Action, dated Sep. 16, 2005 in U.S. Appl. No. 10/696,026 (23 pages).

* cited by examiner

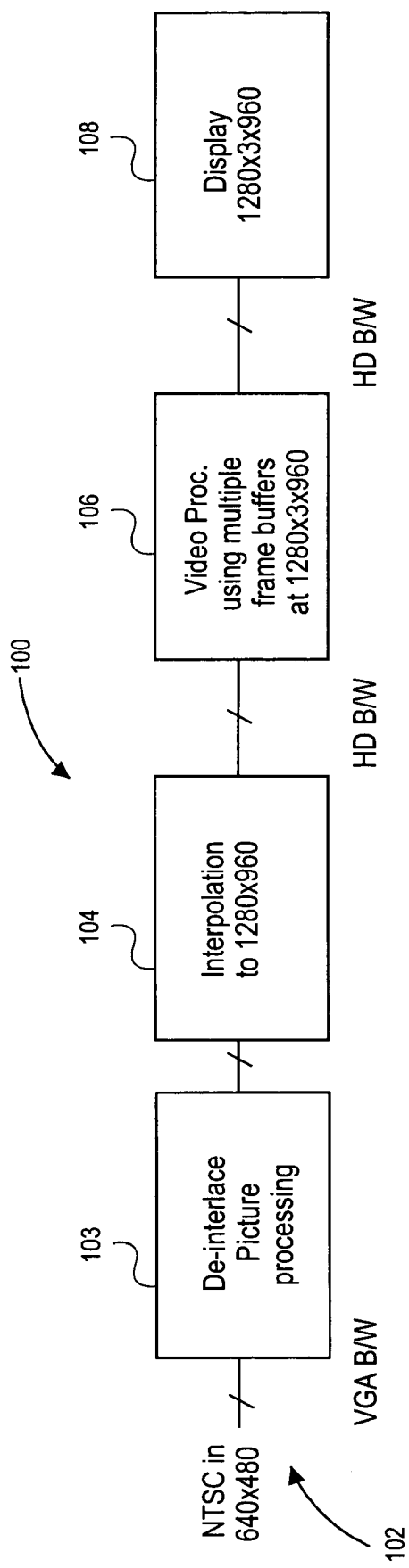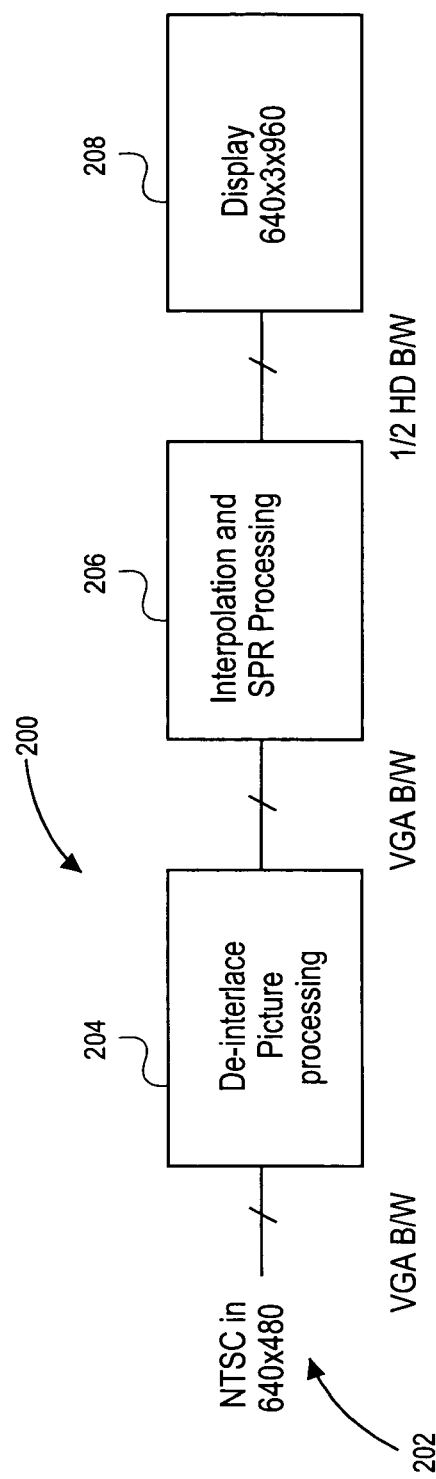

FIG. 24

* IA = Latch1*(-1/16) + Latch2*(9/16) + Latch3*(9/16) + Latch4*(-1/16)
** IB = Latch2*(-1/16) + Latch3*(9/16) + Latch4*(9/16) + Latch5*(-1/16)

Line Select Output for bypass mode

DISPLAY SYSTEM HAVING IMPROVED MULTIPLE MODES FOR DISPLAYING IMAGE DATA FROM MULTIPLE INPUT SOURCE FORMATS

RELATED APPLICATIONS

The present application is related to commonly owned (and filed on even date) United States Patent Applications: (1) U.S. patent application Publication No. 2005/0088385 ("the 385 application"), entitled "SYSTEM AND METHOD FOR PERFORMING IMAGE RECONSTRUCTION AND SUBPIXEL RENDERING TO EFFECT SCALING FOR MULTI-MODE DISPLAY", which is hereby incorporated herein by reference in its entirety.

BACKGROUND

In commonly owned United States Patent Applications: (1) U.S. Patent Application Publication No. 2002/0015110 ("the '110 application), entitled "ARRANGEMENT OF COLOR PIXELS FOR FULL COLOR IMAGING DEVICES WITH SIMPLIFIED ADDRESSING," filed Jul. 25, 2001; (2) U.S. Patent Application Publication No. 2003/0128225 ("the '225 application), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002: (3) U.S. Patent Application Publication No. 2003/0128179 ("the '179 application), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS, "filed Oct. 22, 2002; (4) U.S. Patent Application Publication No. 2004/0051724 ("the '724 application), entitled "IMPROVED FOUR COLOR ARRANGEMENTS AND EMITTERS FOR SUB-PIXEL RENDERING" filed Sep. 13, 2002; (5) U.S. Patent Application Publication No. 2003/0117423 ("the '423 application), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) U.S. Patent Publication No. 2003/0090581 ("the '581 application), entitled "COLOR DISPLAY HAVING HORIZONTAL SUB-PIXEL ARRANGEMENTS AND LAYOUTS," filed Oct. 22, 2002; (7) U.S. Patent Application Publication No. 2004/0080479 ("the '479 application), entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, each of which is herein incorporated by reference in its entirety, novel sub-pixel arrangements are therein disclosed for improving the cost/performance curves for image display devices.

For certain subpixel repeating groups having an even number of subpixels in a horizontal direction, the following systems and techniques to affect proper dot inversion schemes are disclosed and are herein incorporated by reference in their entirety: (1) U.S. Patent Application Publication No. 2004/0246280 ("the '280 application), entitled "IMAGE DEGRADATION CORRECTION IN NOVEL LIQUID CRYSTAL DISPLAYS"; (2) U.S. Patent Application Publication No. 2004/0246213 ("the '213 application), entitled "DISPLAY PANEL HAVING CROSSOVER CONNECTIONS EFFECTING DOT INVERSION"; (3) U.S. Patent Application Publication No. 2004/0246381 "the '381 application), entitled "SYSTEM AND METHOD OF PERFORMING DOT INVERSION WITH STANDARD DRIVERS AND BACKPLANE ON NOVEL DISPLAY PANEL LAYOUTS"; (4) U.S. Patent Application Publication No. 2004/0246278 ("the '278 application), entitled "SYSTEM AND METHOD FOR COMPENSATING FOR VISUAL EFFECTS UPON PANELS HAVING FIXED PATTERN NOISE WITH REDUCED QUANTIZATION ERROR"; (5) U.S. Patent Application Publication No. 2004/0246279 ("the '279 application), entitled "DOT INVERSION ON NOVEL DISPLAY PANEL LAYOUTS WITH EXTRA DRIVERS"; (6) U.S. Patent Application Publication No. 2004/0246404 ("the '404 application), entitled "LIQUID CRYSTAL DISPLAY BACKPLANE LAYOUTS AND ADDRESSING FOR NON-STANDARD SUBPIXEL ARRANGEMENTS"; and (7) U.S. Patent Application Publication No. 2005/0083277 ("the '277 application), entitled "IMAGE DEGRADATION CORRECTION IN NOVEL LIQUID CRYSTAL DISPLAYS WITH SPLIT BLUE SUBPIXELS".

These improvements are particularly pronounced when coupled with sub-pixel rendering (SPR) systems and methods further disclosed in those applications and in commonly owned United States Patent Applications: (1) U.S. Patent Application Publication No. 2003/0034992 ("the '992 application), entitled "CONVERSION OF A SUB-PIXEL FORMAT DATA TO ANOTHER SUB-PIXEL DATA FORMAT," filed Jan. 16, 2002; (2) U.S. Patent Application Publication No. 2003/0103058 ("the '058 application), entitled "METHODS AND SYSTEMS FOR SUB-PIXEL RENDERING WITH GAMMA ADJUSTMENT," filed May 17, 2002; (3) U.S. Patent Application Publication No. 2003/0085906 ("the '906 application , entitled "METHODS AND SYSTEMS FOR SUB-PIXEL RENDERING WITH ADAPTIVE FILTERING," filed Aug. 8, 2002; (4) U.S. Patent Application Publication No. 2004/0196302 ("the '302 application), entitled "SYSTEMS AND METHODS FOR TEMPORAL SUB-PIXEL RENDERING OF IMAGE DATA" filed Mar. 4, 2003; (5) U.S. Patent Application Publication No. 2004/0174380 ("the '380 application), entitled "SYSTEMS AND METHODS FOR MOTION ADAPTIVE FILTERING," filed Mar. 4, 2003; (6) U.S. Patent Application Publication No. 2004/0174375 ("the '375 application ,entitled "SUB-PIXEL RENDERING SYSTEM AND METHOD FOR IMPROVED DISPLAY VIEWING ANGLES" filed Mar. 4, 2003; (7) U.S. Patent Application Publication No. 2004/0196297 ("the '297 application), entitled "IMAGE DATA SET WITH EMBEDDED PRE-SUBPIXEL RENDERED IMAGE" filed Apr. 7, 2003, which are hereby incorporated herein by reference in their entirety.

Improvements in gamut conversion and mapping are disclosed in commonly owned and co-pending U.S. Patent Applications: (1) U.S. Patent Application Publication No. 2005/0083345 ("the '345 application), entitled "HUE ANGLE CALCULATION SYSTEM AND METHODS", filed Oct. 21, 2003; (2) U.S. Patent Application Publication No. 2005/0083341 ("the '341 application), entitled "METHOD AND APPARATUS FOR CONVERTING FROM SOURCE COLOR SPACE TO RGBW TARGET COLOR SPACE", tiled Oct. 21, 2003; (3) U.S. Patent Application Publication No. 2005/0083352 ("the '352 application)), entitled "METHOD AND APPARATUS FOR CONVERTING FROM A SOURCE COLOR SPACE TO A TARGET COLOR SPACE", filed Oct. 21, 2003; and (4) U.S. Patent Application Publication No. 2005/0083344 ("the '344 application), entitled "GAMUT CONVERSION SYSTEM AND METHODS", filed Oct. 21, 2003, which are hereby incorporated herein by reference in their entirety. All patent applications mentioned in this specification are hereby incorporated by reference.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

FIG. 1 shows a conventional signal processing pathway for a standard display/monitor/television unit displaying a television signal thereon.

FIG. 2 depicts one embodiment of the present invention wherein a standard television signal is processed and shown on a display/monitor/television that shows a reduction in bandwidth within the unit.

FIG. 6 shows one embodiment of a EDID circuit to help enable multi-mode operation of a display system as controlled by a personal computer or the like.

FIGS. 23 and 24 show one embodiment of a two-channel input pixel interpolation block and a possible signal diagram respectively.

DETAILED DESCRIPTION

Figure 3:
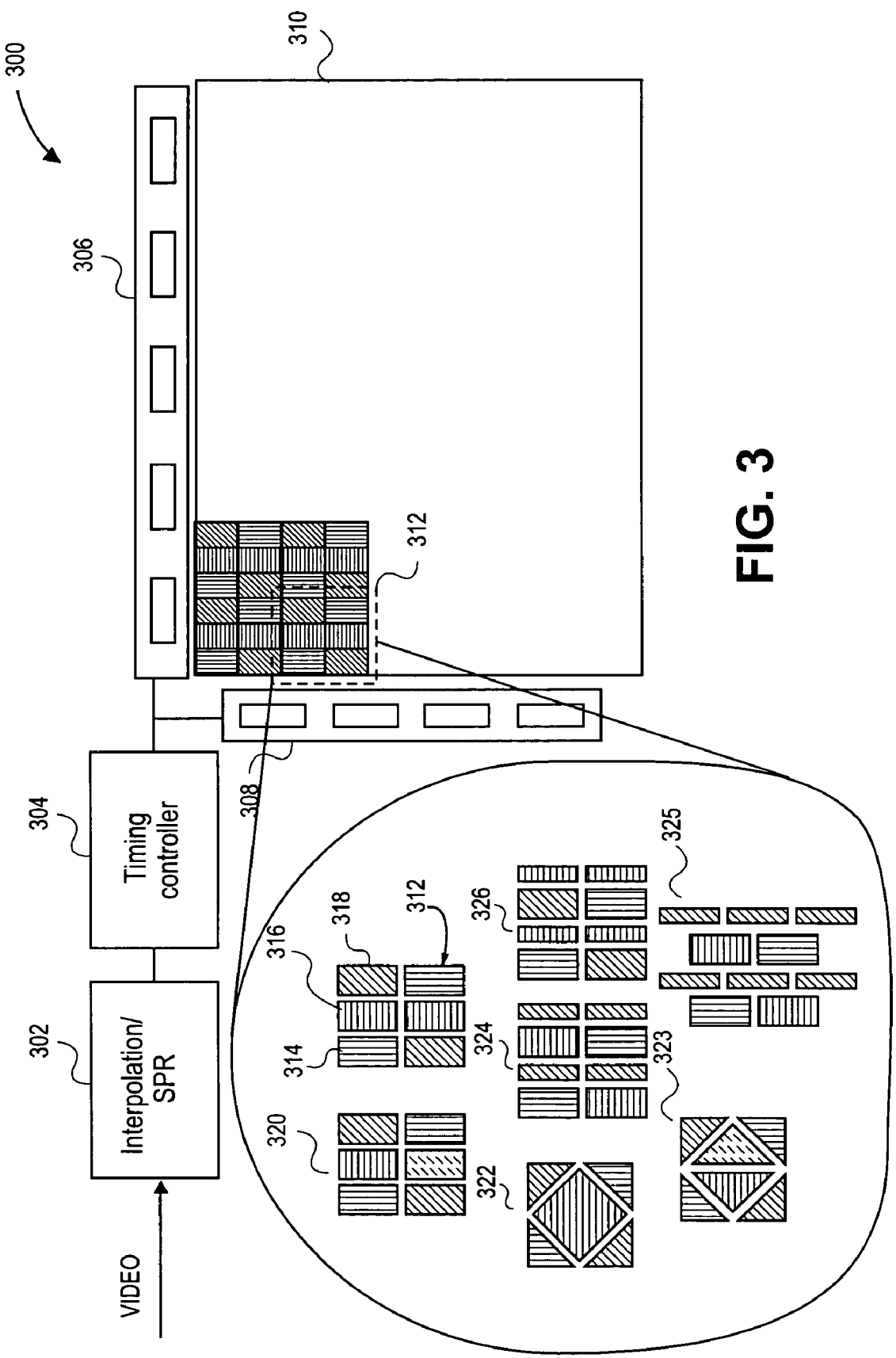
FIG. 3 shows one embodiment of a display/monitor/television architecture built in accordance with the principles of the present invention.

Reference will now be made in detail to implementations and embodiments, examples of which are illustrated in the accompanying drawings. Wherever possible, the same reference numbers will be used throughout the drawings to refer to the same or like parts.

Currently, there are a number of television broadcast standards in existence and several companies have attempted to create display systems that are capable of receiving a number of such broadcasts and rendering them onto a common display.

FIG. 1 is typical of some of the image processing pathways through these multi-mode displays. Pathway 100 starts by inputting one of any number of standard television signals at 102—possibly in need of de-interlacing picture processing at 103. As one example, the signal could be NTSC in 640×480 RGB format—i.e. having 640×3×480 resolution. An image processing block 104 accepts this data and upsamples the data to 1280×3×960 data for rendering on, for example, an RGB striped 1280×3×960 display. The signal leaving image processing block 104 is at approximately "high definition television" (HD) bandwidths and is input into at video processing block 106, which typically incorporates frame buffers at approximately 1280×3×960 dimensioning. Any desired auxiliary for the display system—such as subpixel rendering, response time enhancement, or other image enhancement function—could be performed by the video processing block. The output of video processing block 106 is again of the order of HD bandwidth—which is received as, for example, 1280×960 input into the aforementioned display.

In accordance with the principles of the present invention, however, FIG. 2 shows one embodiment of a different image processing pathway that can occur to give similar image rendering performance—but with reduced memory and bandwidth requirements. Pathway 200 could accept one of any number of standard television signals at 202 (e.g. the same NTSC signal as in FIG. 1). This signal is of the order of NTSC bandwidth and is input into an optional de-interlacing picture processing block 204 (if de-interlacing is required of the signal). The output of this block is again of the order of NTSC bandwidth and is subsequently input into an interpolation/subpixel rendering (SPR) block 206.

As will be further discussed below and as is further detailed in the co-pending related applications herein incorporated by reference, the interpolation/SPR block 206 does not need multiple frame buffers at 1280×3×960 dimensioning. Additionally, the signal that is output to the display 208 is on the order of one half of the bandwidth associated with HD—even though the rendered image is of HD quality. This is possible, in part, because display 208 employs one of a number of novel subpixel layouts disclosed in many of the commonly assigned applications incorporated by reference above.

FIG. 3 shows one possible embodiment of an architecture as made in accordance with the principles of the present invention. Display system 300 accepts one of a plurality of analog and/or digital signals for multi-mode processing— for example, NTSC, VGA or SXGA RGB data, HDTV, and other formats. The signal is fed into the interpolation and/or SPR block 302 where the input data may be appropriately scaled and subpixel rendered for display. In this example, the output of block 302 may be input into a timing controller 304—however, it should be appreciated that, in other embodiments, the interpolation and SPR may be incorporated into the timing controller itself, may be built into the panel (particularly using LTPS or other like processing technologies), or may reside elsewhere in the display system (e.g. within a graphics controller). The scope of the present invention should not be particularly limited to the placement of the interpolation and/or subpixel rendering within the system.

In this particular embodiment, the data and control signals are output from timing controller 304 to column drivers 306 and row drivers 308. Data is then sent to the appropriate subpixels on display panel 310. As shown here, panel 310 is formed by a substantially repeating subpixel grouping 312, which is comprised—as seen in an expanded view—of a 2×3 subpixel unit wherein vertical striped subpixel 314 depicts the color red, horizontal striped subpixel 316 depicts the color blue, and the diagonally striped subpixel 318 depict the color green. It should be appreciated that the subpixels in repeating group 312 are not drawn to scale with respect to the display system; but are drawn larger for ease of viewing. One possible dimensioning for display 310 is 1920 subpixels in a horizontal line (640 red, 640 green and 640 blue subpixels) and 960 rows of subpixels. Such a display would have the requisite number of subpixels to display VGA, 1280×720, and 1280×960 input signals thereon.

Table 1 below is a summary of the possible display systems comprising panels having subpixel resolutions— e.g. 640×3×960 would indicate a panel having 640 red, 640 green and 640 blue subpixels in a row, comprising 960 such rows. Such a panel used in the present invention would have an effective maximum resolution of 1280×960—wherein each red and green subpixel could effectively be the center of luminance for an RGB pixel value. The last column indicates some of the modes that such a display system of the present invention could then support. For example, the above described panel and system could support VGA, SVGA, NTSC, PAL and 720p video formats.

TABLE 1

| Subpixel resolution | Effective max resolution | Supported modes |
| --- | --- | --- |
| 640 × 3 × 960 (4:3) | 1280 × 960 | VGA (1:2), SVGA, NTSC, PAL, 720p (1:1) |
| 640 × 3 × 1024 (5:4) | 1280 × 1024 | VGA, SVGA, XGA, SXGA (1:1), NTSC, PAL, 720p |
| 960 × 3 × 1080 (16:9) | 1920 × 1080 | WVGA, WXGA, 720p, 1080i (1:1) |
| 852 × 3 × 960 (16:9) | 1704 × 960 | WVGA (1:2), WXGA |

TABLE 1-continued

| Subpixel resolution | Effective max resolution | Supported modes |
| --- | --- | --- |
| 1280 × 3 × 1440 (16:9) | 2560 × 1440 | WXGA (1:2), 720p, 1080i |

Note:
Possible aspect ratio included in column 1, and possible scaling ratio in column 3

As further disclosed in the related patent application incorporated herein, displaying standard 640×480 television signal onto a panel as discussed herein—i.e. one that comprises 640×3×960 physical subpixels; but has greater image quality with subpixel rendering—may take advantage of interpolation followed by cross-color sharpened subpixel rendering to effectively scale the image to 1280×960 logical pixels. This reconstructs the image with reduced moiré and aliasing artifacts since the interpolation serves as a low-pass reconstruction filter for the luminance signal while the sharpened subpixel rendering filter serves to remove any spatial frequencies that may cause chromatic aliasing, thus preserving the color balance and image constrast.

Also, shown in FIG. 3, other subpixel repeating groups 320, 322, 323, 324, 325 and 326 are also possible for purposes of the present invention. These subpixel repeating groups and algorithms to drive them are further disclosed in the above applications incorporated by reference. The subpixel repeating group 320 depicts use of at least a fourth color—e.g. white, cyan, blue-grey, magenta or the like— which could expand the color gamut and/or brightness of the display over and above traditional 3 color primary systems. The other subpixel repeating groups could similarly comprise at least a fourth color as well. As with some of these subpixel repeating groups, the bandwidth and memory requirements are in a range that is less than what traditional RGB stripe systems require, and down to approximately one half of HD bandwidth. One of the reasons is the subpixel rendering as disclosed in the '612 application, the '355 application, and the '843 application boosts the effective resolution of the panels with these novel layouts in both horizontal and vertical axes. Thus, the subpixels in question may be resized to (for example) a 2:3 aspect ratio, as opposed to the standard 1:3 aspect ratio found in traditional RGB stripe displays. This resizing creates a display panel of comparable image display quality; but with approximately one half the number of subpixels in a horizontal direction. This reduces the bandwidth and memory requirements appropriately.

Figure 4:
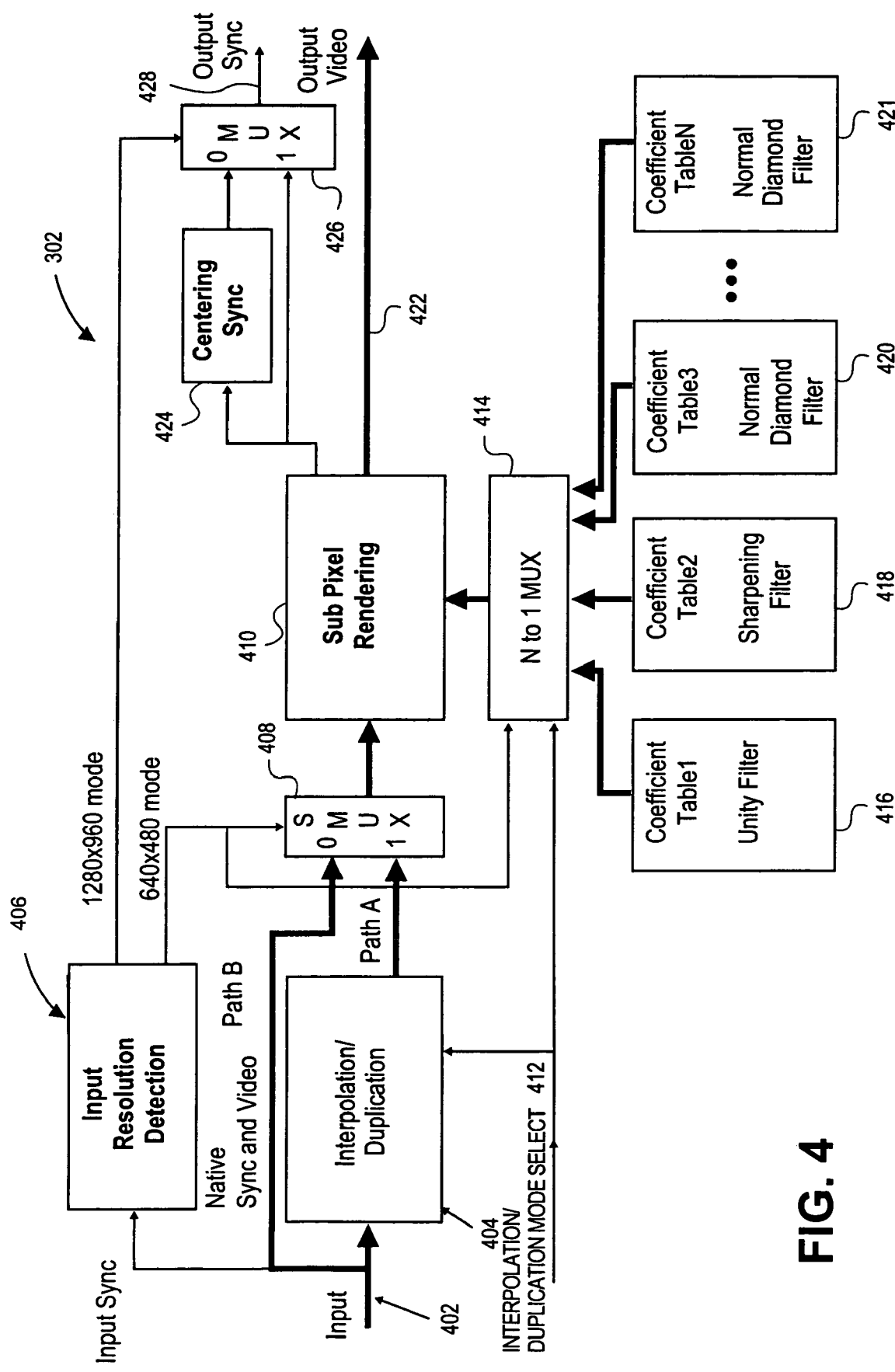
FIG. 4 depicts one possible embodiment of an architecture implementing a multi-mode operation on a display made in accordance with the principles of the present invention.

FIG. 4 shows one possible embodiment of a present interpolation/SPR block 302. Block 302 is depicted here as one that may optionally support a multi-mode (i.e. accepts multiple video input formats and displays one or more output video formats) operation. It will be appreciated that, although FIG. 4 shows particular resolution specification numbers and other implementation details, these details are meant for illustrative purposes only and the present invention is not to be limited to particular numbers or formats specified in the Figures.

Input signal 402 arrives at interpolation/duplication block 404 and an input resolution detector 406. As shown for illustration purposes, signal 402 could be 640×480 or 1280× 960. Two pathways (Path A and B) are shown as one embodiment of multi-mode support. If the detector 406 detects the signal as a 1280×960 signal, then the interpolation/duplication block 404 is bypassed—e.g. by either disabling the block or, as shown, using a MUX 408 to select an alternate data path (e.g. Path B) for input into the SPR block 410.

Interpolation/duplication block 404 could be implemented, as one embodiment, to either use interpolation (e.g. linear, bi-linear, cubic, bi-cubic and the like) or duplication (i.e. replicate horizontal pixel data to expand from 640 to 1280 pixel values and replicate line data to expand from 480 to 960 line values) to achieve appropriate scaling. It will be appreciated that other embodiments could employ either only interpolation or only duplication as opposed to having a choice among the two modes. In this embodiment, a doubling (interpolation or duplication) mode signal 412 could be supplied to block 404 and to a MUX 414 to select the appropriate filter kernel to the SPR block 410.

Three such filters are shown 416, 418, 420 for illustrative purposes. Filter 416 "unity" filter—which could be used with VGA input and in a duplication mode. Such sharpening filter could be implemented with the following coefficients for all colors (R, G and B):

$$\begin{matrix} 0 & 0 & 0 \\ 0 & 255 & 0 \\ 0 & 0 & 0 \end{matrix} \times 1/255.$$

Filter 418 could be a "sharpening" filter, designed to give improved image quality for video data; and could possibly be used for VGA input with an interpolation mode. One such sharpening filter might be implemented (for R and G colors) as:

$$\begin{matrix} -16 & 32 & -16 \\ 32 & 192 & 32 \\ -16 & 32 & -16 \end{matrix} \times 1/255.$$

Filter 420 could be a "diamond" filter, designed to give improved image quality for text image data and could possibly be used for SXGA input. One such diamond filter might be implemented (for R and G colors) as:

$$\begin{matrix} 0 & 32 & 0 \\ 32 & 128 & 32 \\ 0 & 32 & 0 \end{matrix} \times 1/255.$$

The blue color for the last two filters could be implemented as:

$$\begin{matrix} 0 & 0 & 0 \\ 0 & 128 & 128 \\ 0 & 0 & 0 \end{matrix} \times 1/255.$$

A fourth filter 421 is shown to depict that N filters could be possibly employed by the subpixel rendering block. Such other filters might implement area resampling or a windowed sync function. As mentioned, the choice of which filter to apply could be determined by select signals applied to a MUX 414 with the select signals being a duplication (or interpolation) mode select signal and an input resolution detection signal. The duplication or interpolation mode select signal could be supplied by the user of the display system (e.g. depending upon whether the user wants to display primarily video or text images) or the select signal could be supplied by applications that are accessing the display system and are capable of automatically deciding which mode and/or filter to apply depending upon the state of the application.

Once subpixel rendering has occurred, the video output data can be supplied upon a Video Out line 422 and the sync signals could also be optionally sent to an optional centering sync block 424. Centering sync block 424 could supply an output sync signal 428 depending upon the data (e.g. 640× 480 or 1280×960) format being output. If the output data is 1280×960, then output display image does not need to be centered—e.g. as in a letter box format. If the input is 1280×720, it might be desirable to pad the scaled signal to be centered by appropriate introduction of black lines before and after the 720 active lines of data.

Figure 34:
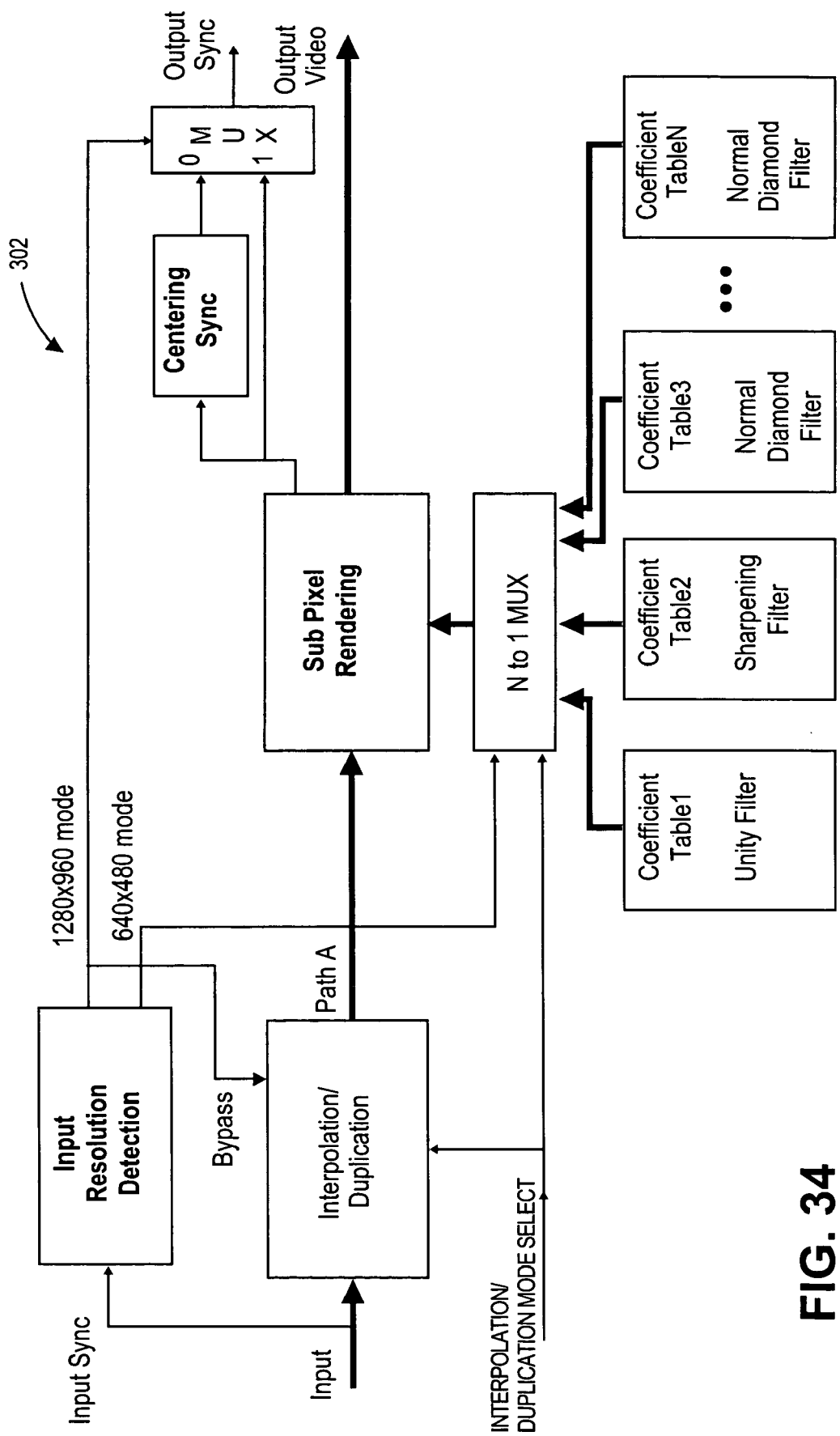
FIG. 34 shows an alternative embodiment to the system of FIG. 4.
Figure 35:
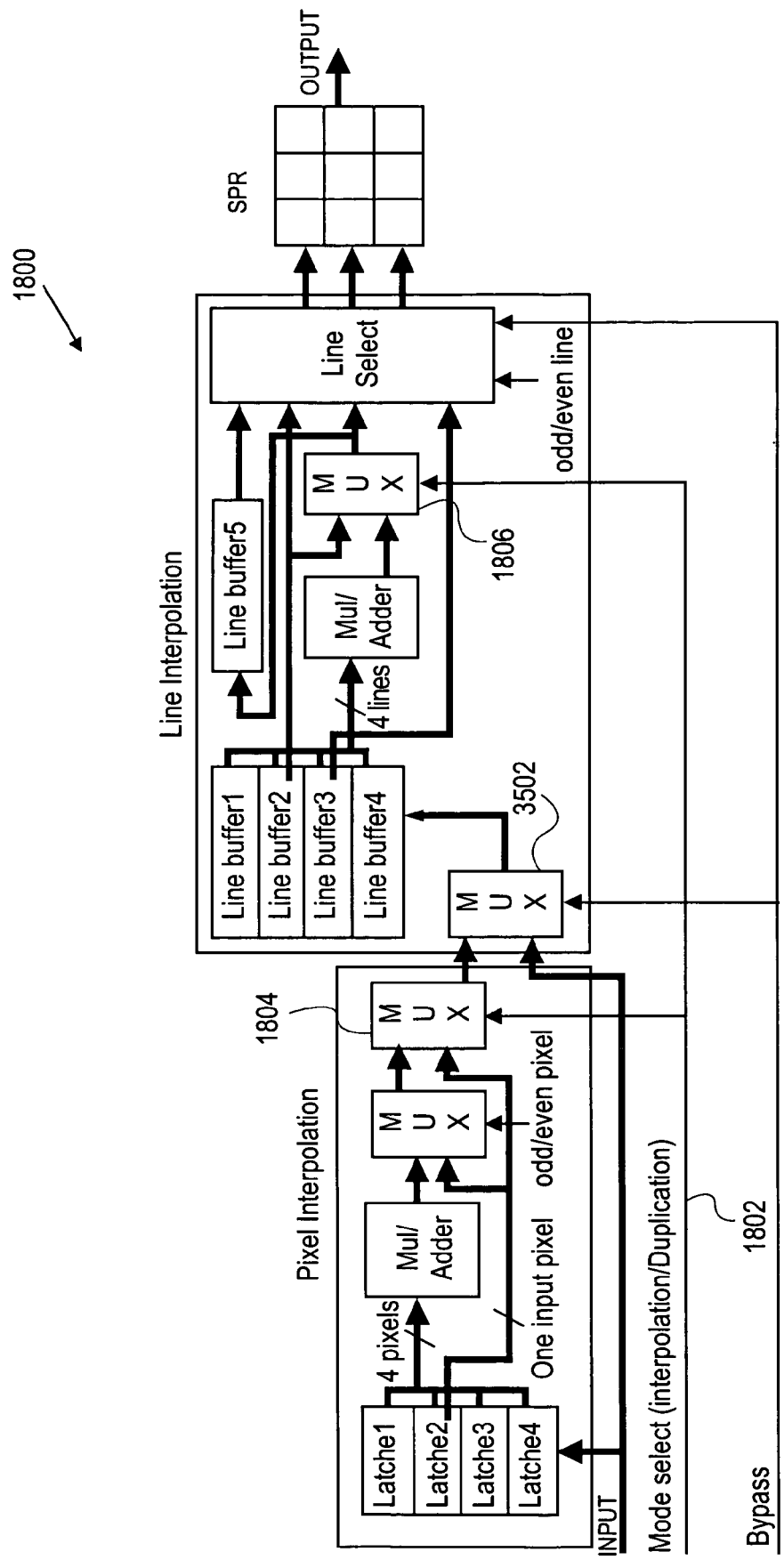
FIG. 35 shows an alternative embodiment to the system of FIG. 18.
Figure 36:
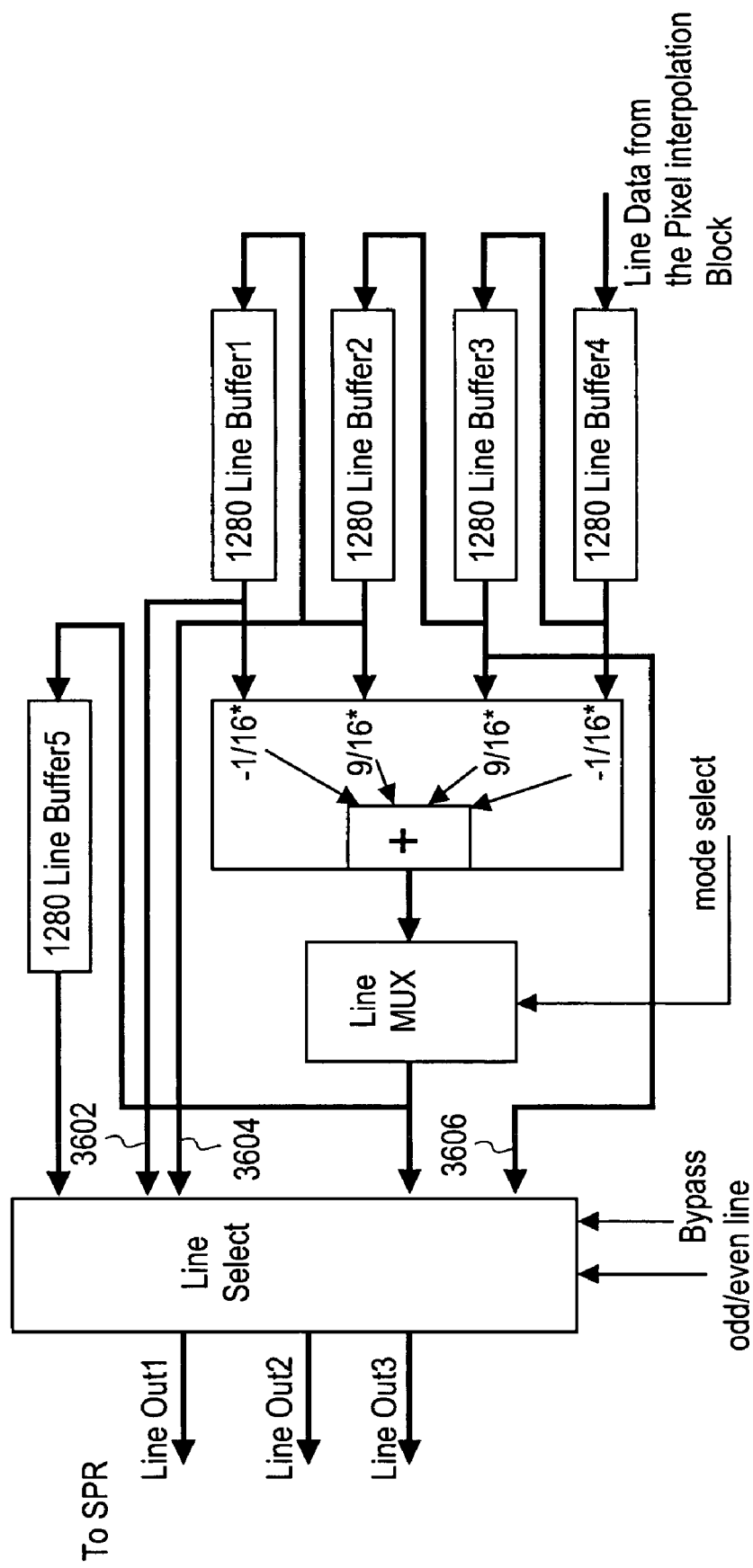
FIG. 36 shows an alternative embodiment to the system of FIG. 25.
Figure 37:
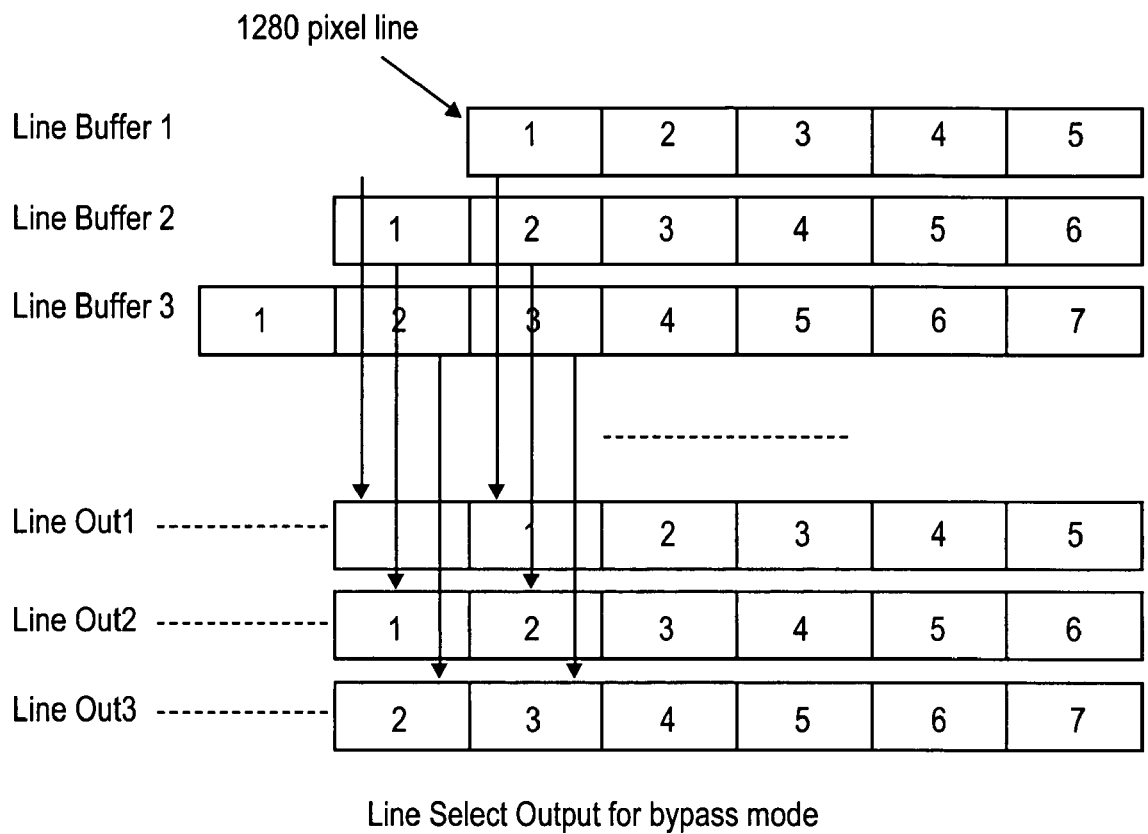
FIG. 37 shows one possible timing diagram for the system of FIG. 36.

FIG. 34 is an alternative embodiment for the system of FIG. 4. In FIG. 34, the Input Resolution Detector sets a "bypass" signal and supplied to the Interpolation/Duplication block so that input signals may be passed through to the SPR block directly—in either serial (depending upon whether buffers are employed in SPR block) or via three data lines. FIG. 35 shows another embodiment of the present system which employs the bypass signal at a Mux 3502 and at Line Select to effect one possible bypass mode. FIG. 36 shows yet another embodiment in which bypass mode is effected to supply data on lines 3602, 3604 and 3606 for such bypass mode of operation. FIG. 37 is one possible timing diagram for the bypass mode of FIG. 36.

Figure 38:
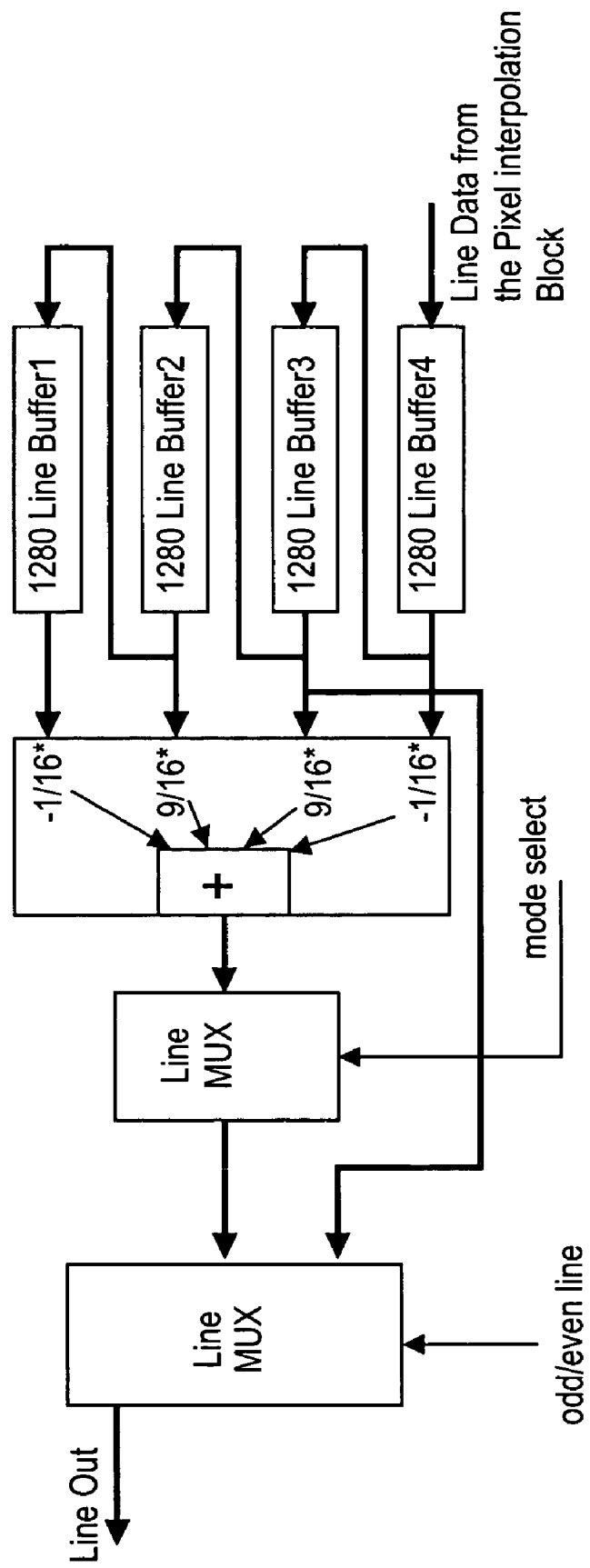
FIG. 38 shows an alternative embodiment to the system of FIGS. 25 and 36.
Figure 39:
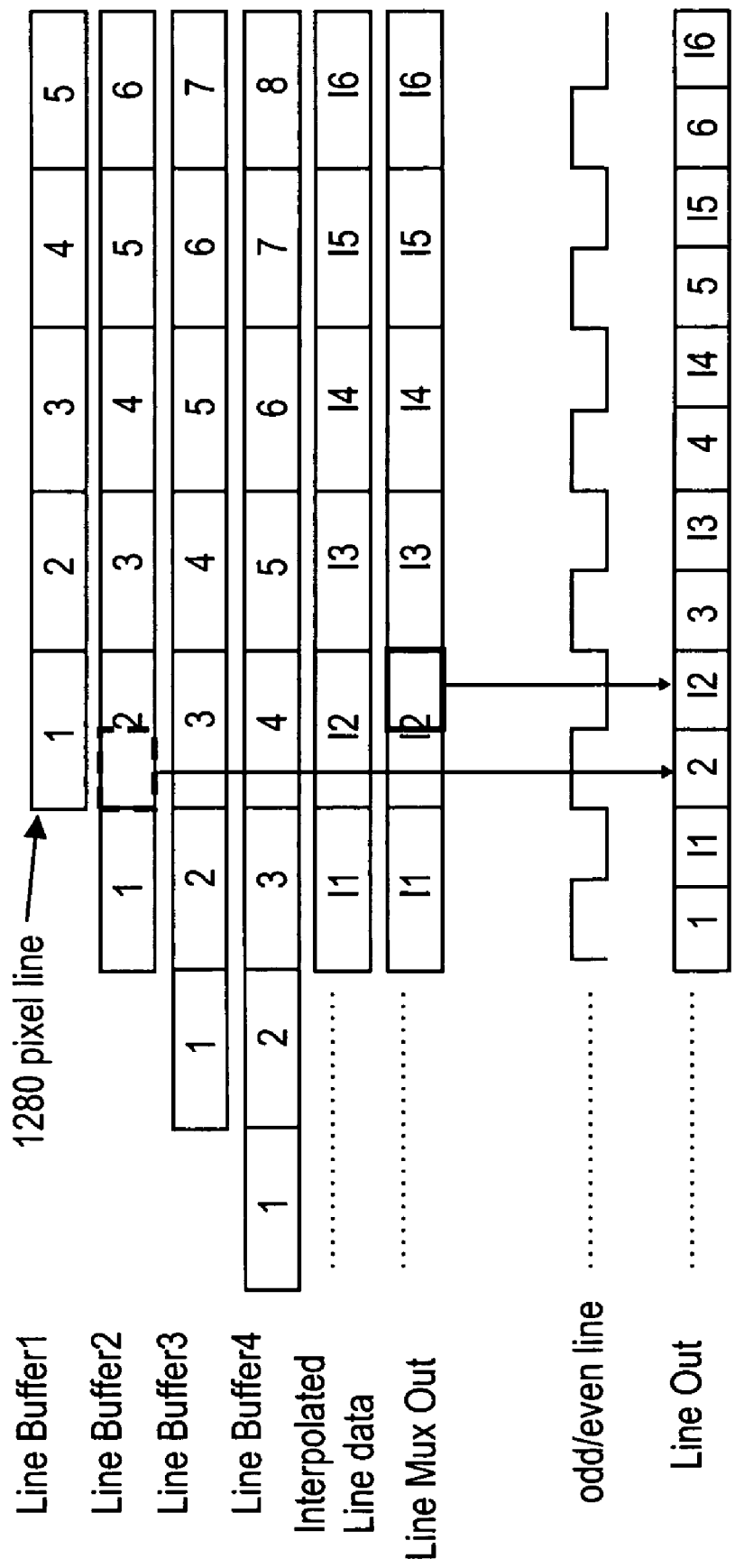
FIGS. 39 and 40 show possible timing diagrams for interpolation mode and duplication mode for FIG. 38.
Figure 40:
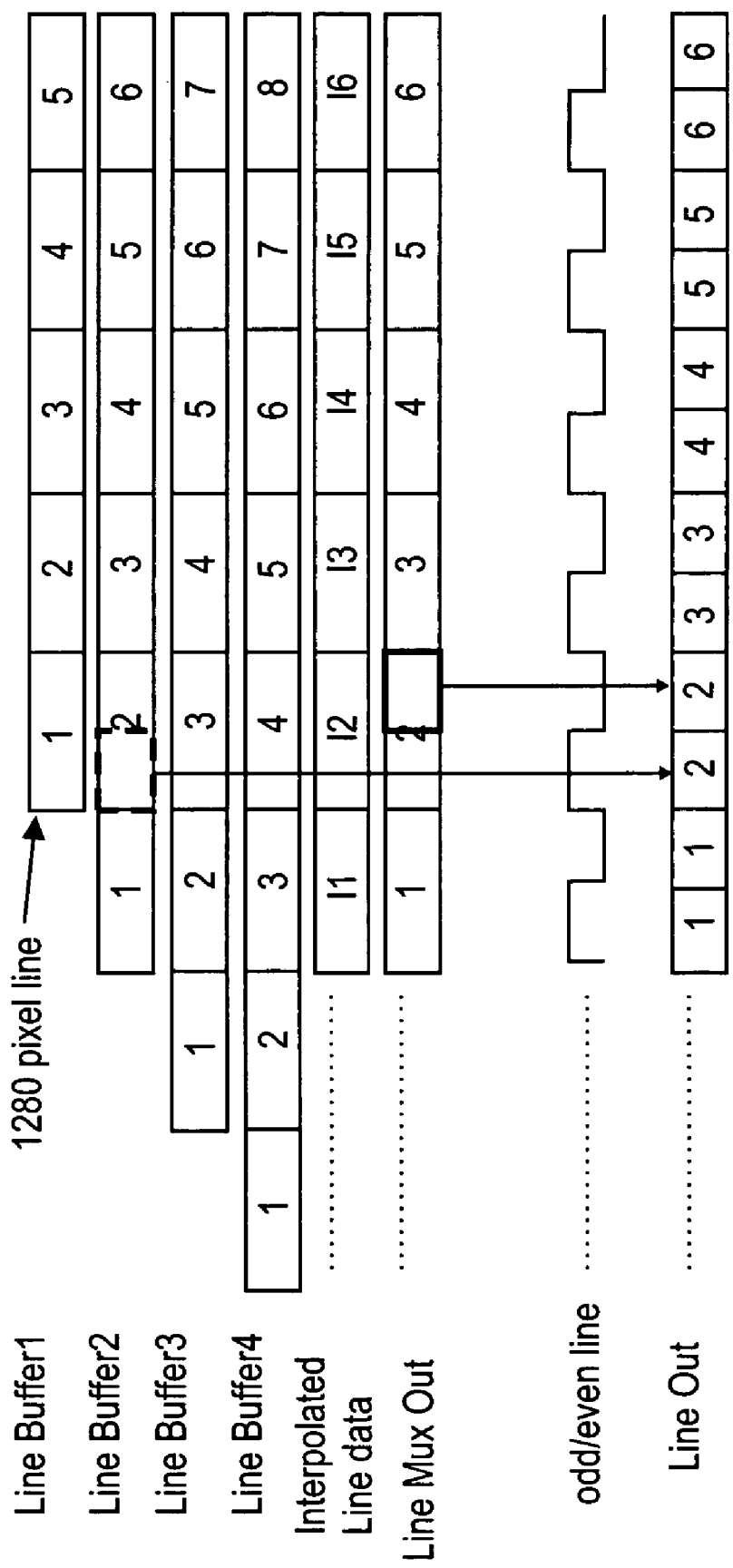

FIG. 38 is one embodiment of the present system that may be used in the Interpolation/Duplication block of FIG. 4. A single Line Out may supply data to the SPR block that may, in turn, buffer the data. FIGS. 39 and 40 show possible timing diagrams for the Interpolation Mode and Duplication Mode respectively for the system of FIG. 38.

Figure 5:
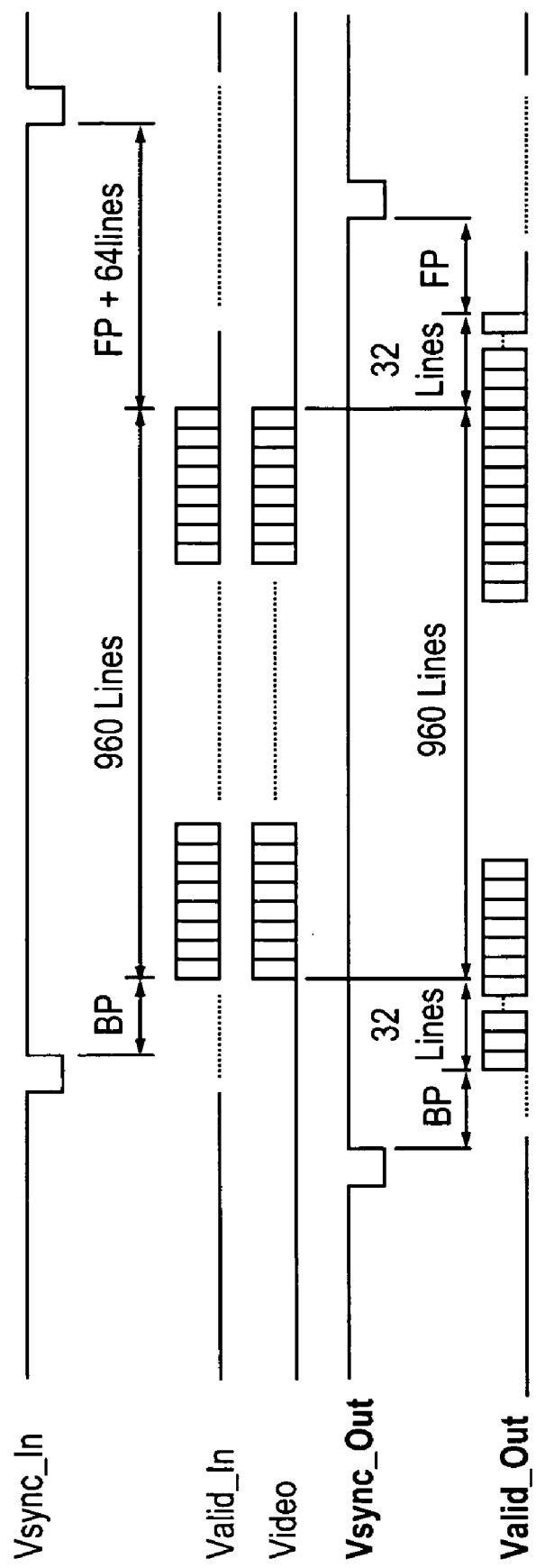
FIG. 5 shows a possible video sync and data timing signals to help effect a proper centering for letter box viewing.

FIG. 5 depicts the effect of applying the appropriate black line padding to a 640×480 scaled output signal for display—e.g. having 1280×1024 subpixels and displaying scaled VGA 1280×960 output data. As may be seen, the centering sync signal could be used to take a video stream bordered by a back porch (BP) delay and a front porch (FP) delay plus 64 lines to create a video stream that has the appropriate BP and FP delays that have a more equal distribution of padded black lines to center the image data on the display.

Figure 6:
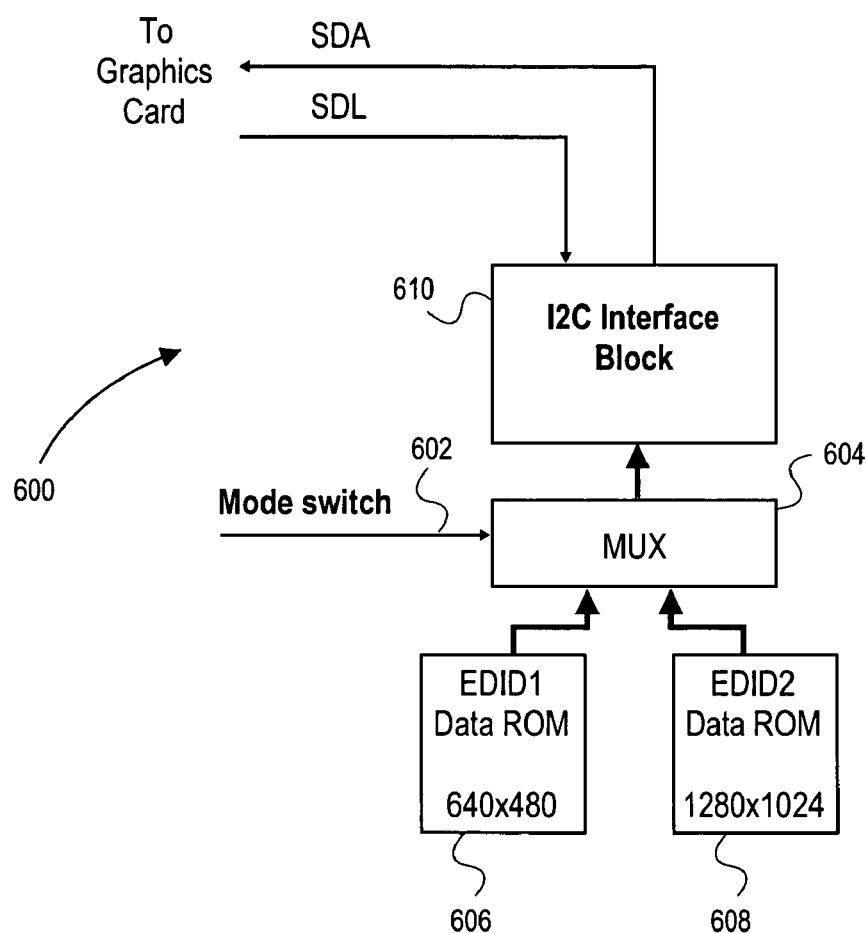

FIG. 6 depicts another optional aspect of the present invention. EDID selection circuit 600 could be implemented to inform another system—e.g. a personal computer (PC) or the like—regarding the display resolution capabilities of the display system. Typically in a display system, EDID comprises a plurality of ROM storage (e.g. 606 and 608 and possible other ROMS that are not shown) that informs a PC or other suitable system what the display capabilities are of the display via an I2C communications channel 610. In a multi-mode display system, however, it may be important for the user or application accessing the display system to inform the PC or the like what the capabilities are and either could select (602) which signal to send to MUX 604. Once the proper EDID data is selected (e.g. as shown VGA or SXGA or any other ROM to enable other modes as necessary), such data would be supplied to the PC via a graphics card or the like.

Figure 7:
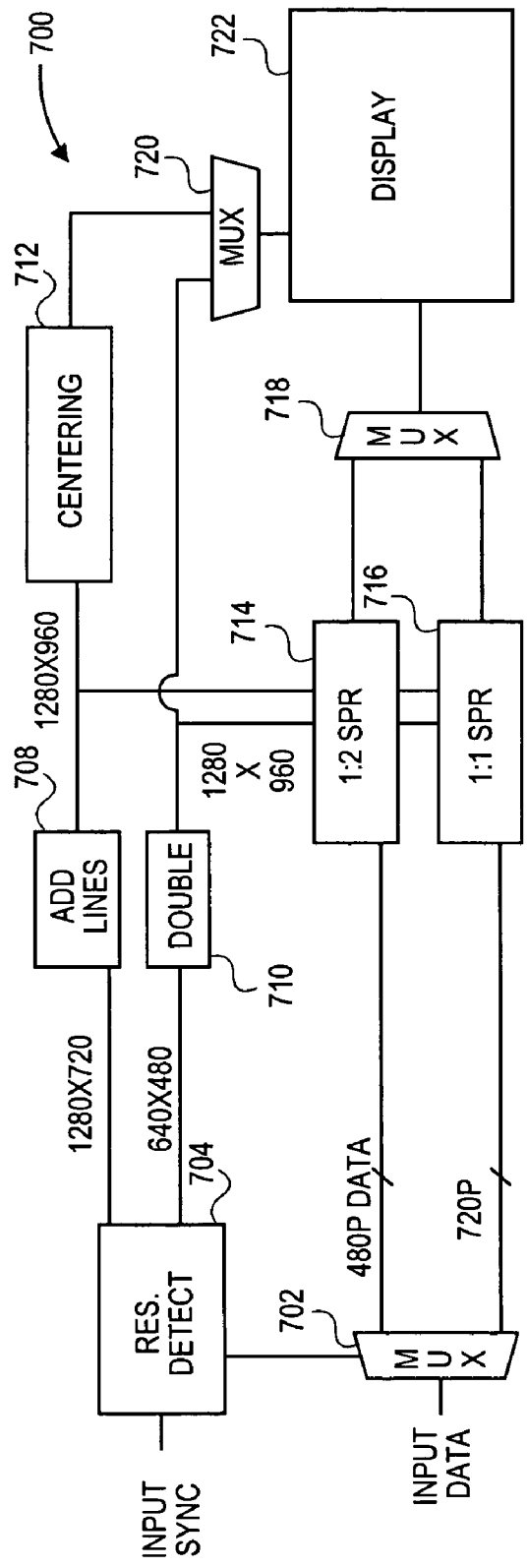
FIGS. 7 and 8 show two alternate embodiments of architectures to effect multi-mode operation of a display system made in accordance with the principles of the present invention.
Figure 8:
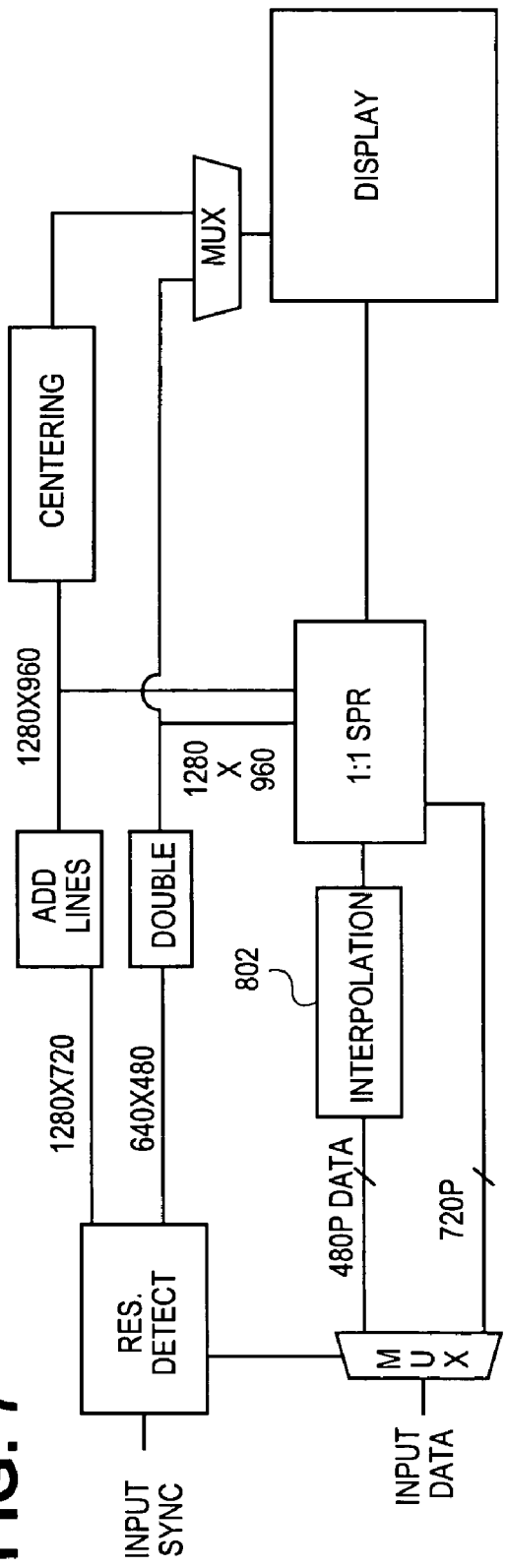

Other embodiments of the present system are shown in FIGS. 7 and 8. FIG. 7 shows a system 700 that accepts a plurality of input signals at MUX 702 and depending upon what resolution detector 704 detects, the input data is sent to a plurality of paths (only two shown here as 480p or 720p data—of course, other data and their paths are possible). Each path may be sent into an SPR block (shown here as a 1:2 SPR and 1:1 SPR 714, 716 respectively—of course, other SPR blocks that implement different scaling modes are possible). Depending upon the resolution of the input data set, the system could add lines (708) or double the number of lines (710), and possibly provide a centering block (712) for one or more resolution modes. The results of the SPR blocks may be multiplexed (718) according to which data is to be rendered upon the display 722. Likewise, the line signals may be multiplexed (720) according to which data is to be rendered on the display. FIG. 8 is yet another embodiment of the present system that is similar to FIG. 7. One difference is that a reduced number of SPR blocks are used in the system because one or more input data paths are interpolated (802) to provide a correct amount of data to the SPR blocks.

Figure 9:
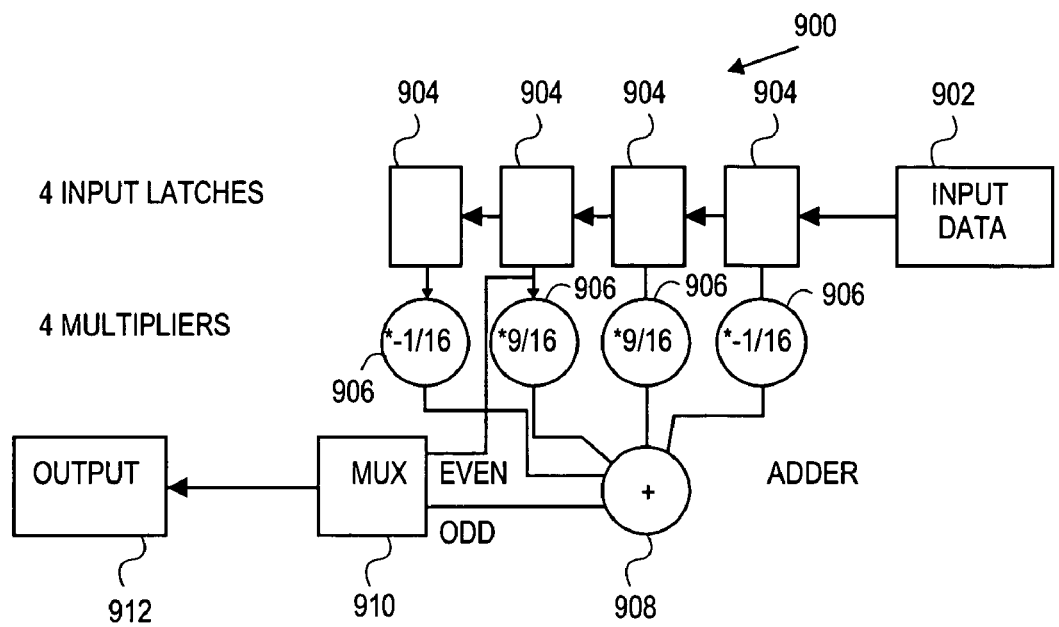
FIG. 9 shows one embodiment of a pixel doubler made in accordance with the principles of the present invention.

Now it will be shown some embodiments suitable to perform some desired interpolation upon image data. FIG. 9 depicts a pixel doubler block 900 that takes input data 902 and latches the input (904). Multiplies 906, adder 908 effect the cubic interpolation scheme mentioned above. It should be appreciated that the given coefficients allow cost effective computation—for example, a divide by ¹⁄₁₆ is a right shift four times and multiplying by 9 can be done with a left shift three times and an add with the original value. On even outputs, one of the input pixels is output directly, on odd outputs, the interpolated value is produced—with even and odd outputs effected by Mux 910.

Figure 10:
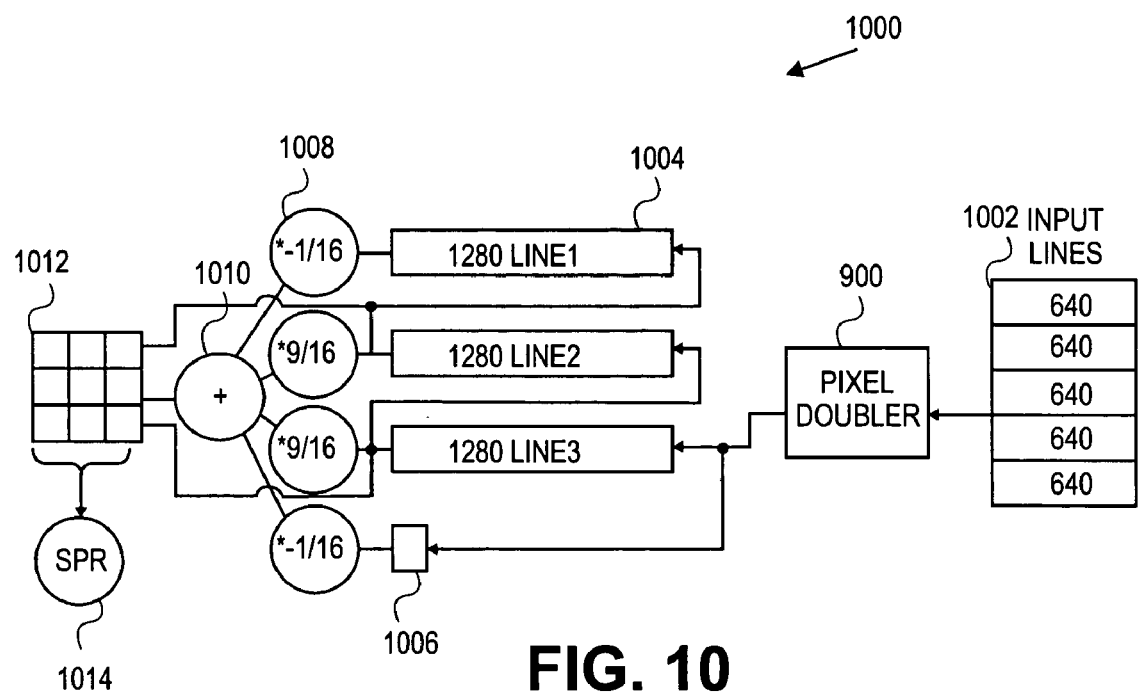
FIG. 10 shows one embodiment of a line doubler made in accordance with the principles of the present invention.

FIG. 10 shows one embodiment of an odd line doubler 1000. Odd line doubler inputs image data 1002 (as shown as a plurality of input lines of 640 pixels each—of course, other line widths are possible for other image data formats), and sends the pixel data to a pixel doubler (e.g. the one disclosed in FIG. 9 or the like) which doubles the width of the line. Three doubled lines are stored into line buffers 1004 (for another cubic interpolation step) and one is buffered 1006 so that the appropriate data is present in the multipliers 1008 and adder 1010 to produce the vertical interpolation. This interpolates between lines 2 and 3. It should be noted that only the last 3 of these values need to be saved in latches 1012—since those 3 (plus 3 values from line 2 above and 3 values from line 3 below are stored in 1012) are desired to do subpixel rendering (SPR) 1014.

It should also be noted that SPR may be done with two line buffers. Combining cubic interpolation with SPR removes the requirement of separate line buffers. An additional line buffer is all that may be needed to do the cubic interpolation. It should additionally be noted that even with SPR, one more line buffer may be added to synchorize the input and output video streams. So, while typical SPR may require a total of 3 line buffers, the present system may make use of 4 line buffers to effect line doubling and cubic interpolation-SPR.

Figure 11:
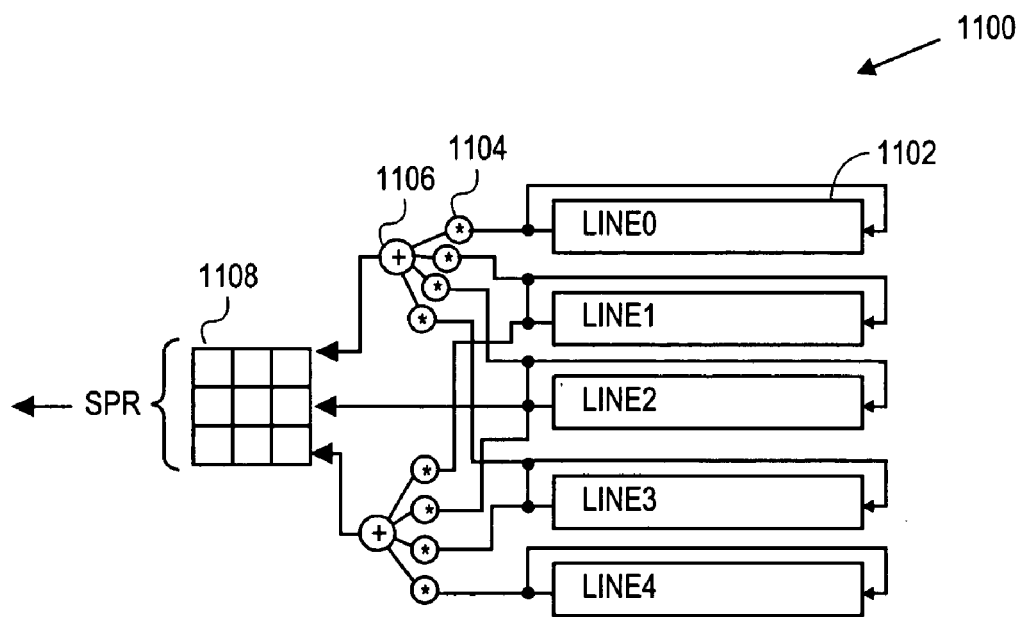
FIGS. 11 and 12 show yet another embodiment of a line doubler made in accordance with the principles of the present invention.
Figure 12:
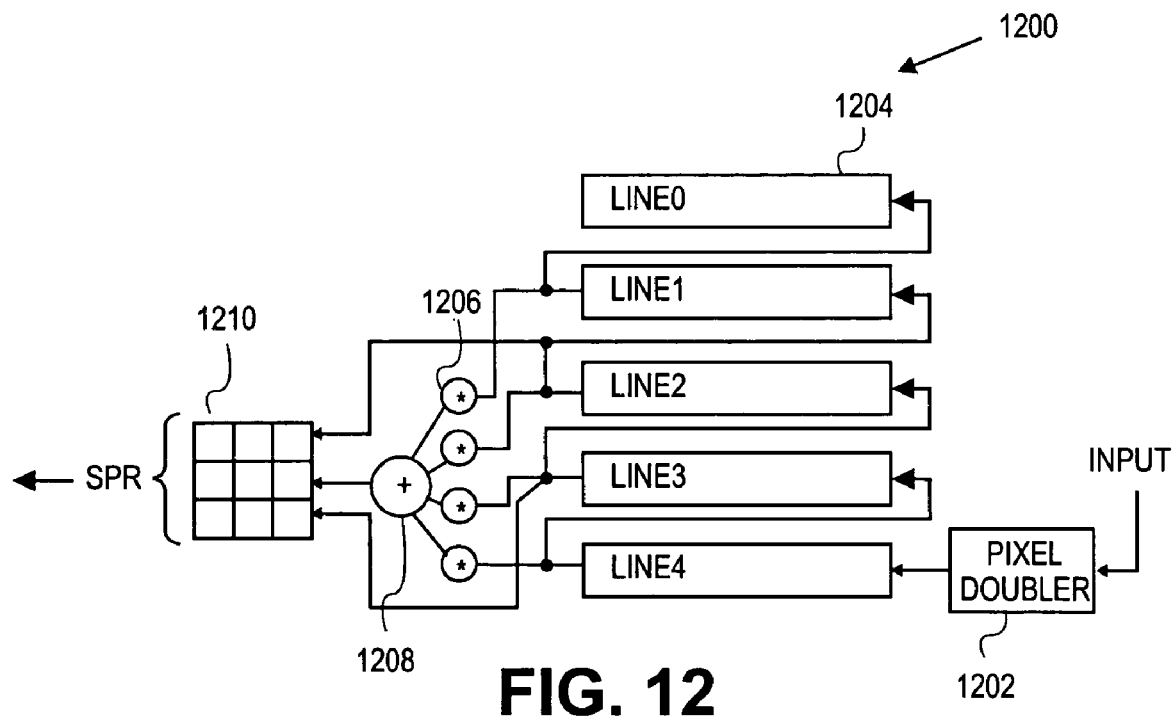

FIGS. 11 and 12 shows yet another embodiment of a full line doubler 1100 and 1200 respectively. FIG. 11 shows a system for generation even lines 1100. Because the system outputs twice as many lines as it inputs, FIG. 11 shows the line buffers 1102 being recirculated such that the odd lines are generated with no new input pixels via multipiers 1104 and adders 1106. Line 2 is output directly to the latches 1108 for SPR and two new interpolated lines are generated—one between Line 1 and 2 and another between Line 2 and 3.

FIG. 12 shows a system 1200 for generating the odd lines. Pixel doubler 1202 produces horizontally interpolated values which are stored in line buffers 1204. Lines 1-4 output to multipliers 1206 and adder 1208, similar to that shown in FIG. 10. The output from adder 1208 plus the direct output from lines 2 and 4 are shifted through latches 1210 to supply the values desired for SPR. Line 4 could also serve as the synchronization buffer as discussed above. Line 0 is employed for saving the data to be used on the even lines as discussed in FIG. 11 above.

Figure 13:
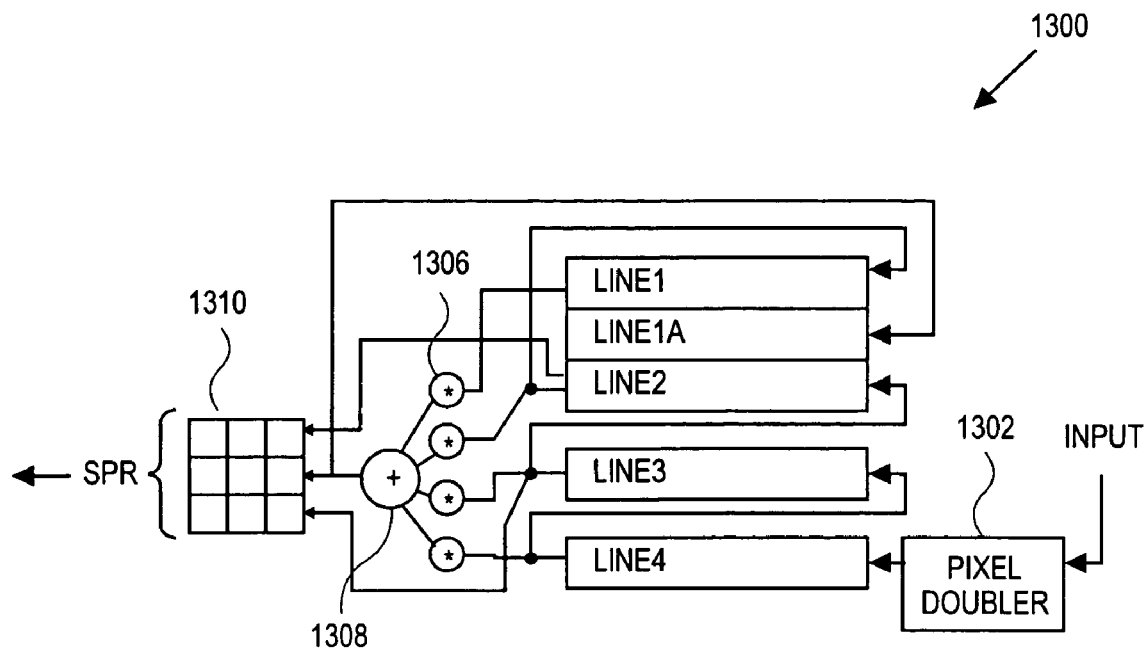
FIGS. 13 and 14 show yet another embodiment of a line doubler made in accordance with the principles of the present invention.
Figure 14:
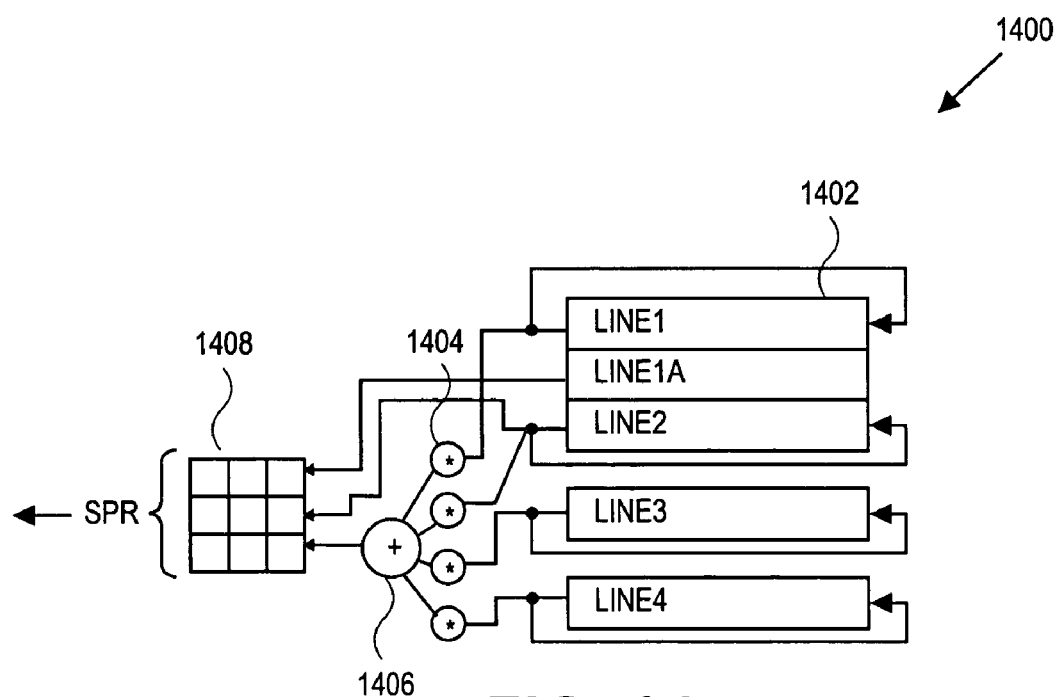

FIGS. 13 and 14 are yet another embodiment of a full line doubler. FIG. 13 shows an odd line doubler 1300. Pixel doubler 1302 inputs data to a plurality of line buffers 1304. Lines 1, 2, 3 and 4 are vertically interpolated to produce the center line of data stored in latches 1310. The output from the adder 1308 is recirculated into a line between Line 1 and 2, and called Line 1A. The output of Line 2 and Line 3 are directly input into latches 1310 for SPR. FIG. 14 shows the even line doubler 1400 where the line bufferes 1402 are recirculated. Lines 1, 2, 3 and 4 are input into multipliers 1404 and adder 1406 to perform vertical interpolation, with the results input into the last buffer of 1408 for SPR. Lines 1A and 2 are directly input into latches 1408. It should be noted that the line buffers in FIGS. 13 and 14 may be shared between the even and odd doublers. During the odd line output, Line 1A is filled in FIG. 13 and that line is used in the even lines in FIG. 14. It should also be noted that the use of Line 1A buffer in FIGS. 13 and 14 obviate the need of the extra multiply/adder as shown in FIGS. 11.

Figures 15, 16:
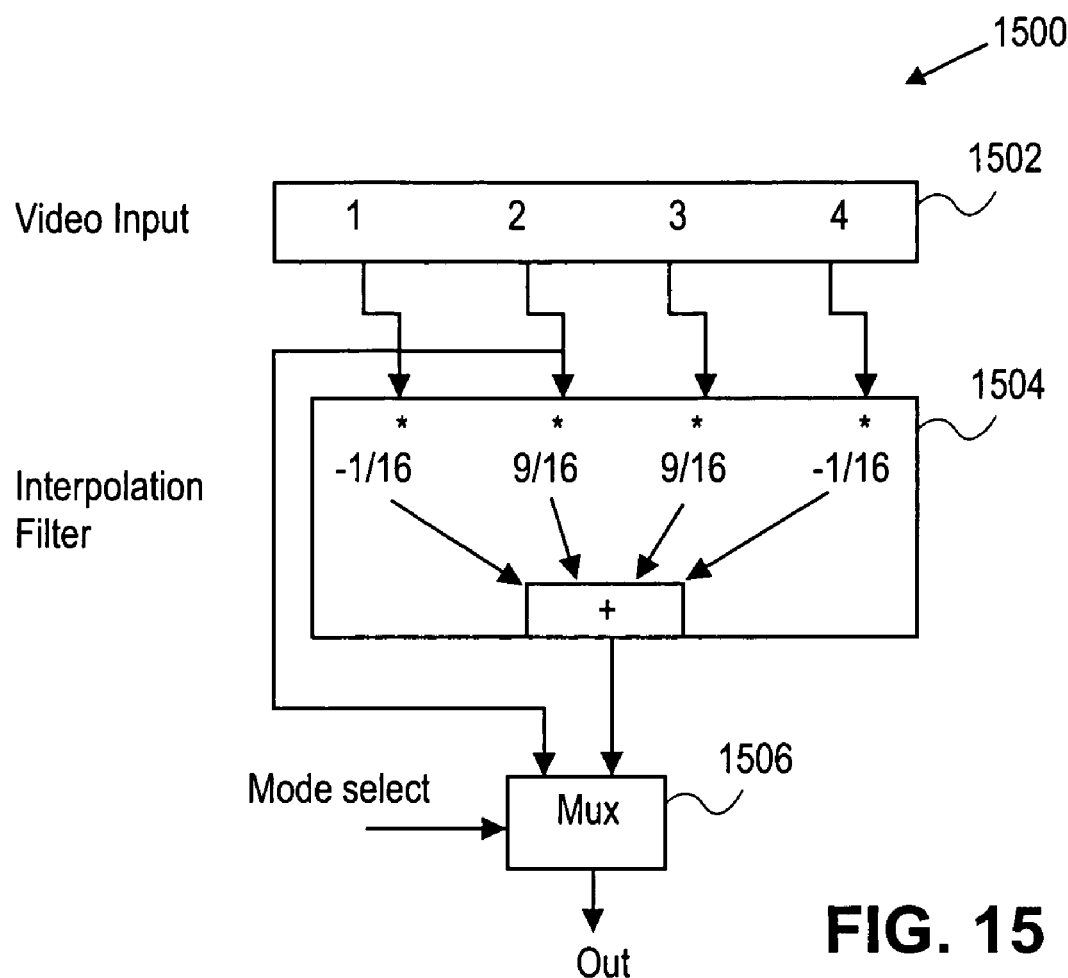
FIGS. 15 and 16 show a high level block diagram of an architecture that may support interpolation as well as data duplication and the effects of its output respectively.

FIGS. 15 and 16 depict yet another embodiment of an interpolation block that may support both interpolation and duplication schemes. In an embodiment that effects multiple modes of resolution, two schemes—interpolation and/or duplication—may be used to effect these modes. For example, if the input resolution is 640×480, it is possible to use either interpolation or duplication to output 1280×960 resolution. Both interpolation and duplication have their own unique properties—interpolation generally makes images smoother; while duplication tends to keep images sharper than interpolation. It is possible to effect interpolation and duplication in one processing block for a more cost effective system. FIG. 15 shows a high level block diagram 1500 of such a system. Video input 1502 is input into interpolation filter 1504 which effects an interpolation scheme (such as the one discussed above). One line of video input, however, bypasses the interpolation block and is supplied at the input of mux 1506.

Depending upon whether interpolation or duplication is desired (via Mode select), the output of the mux is shown in FIG. 16.

Figure 17:
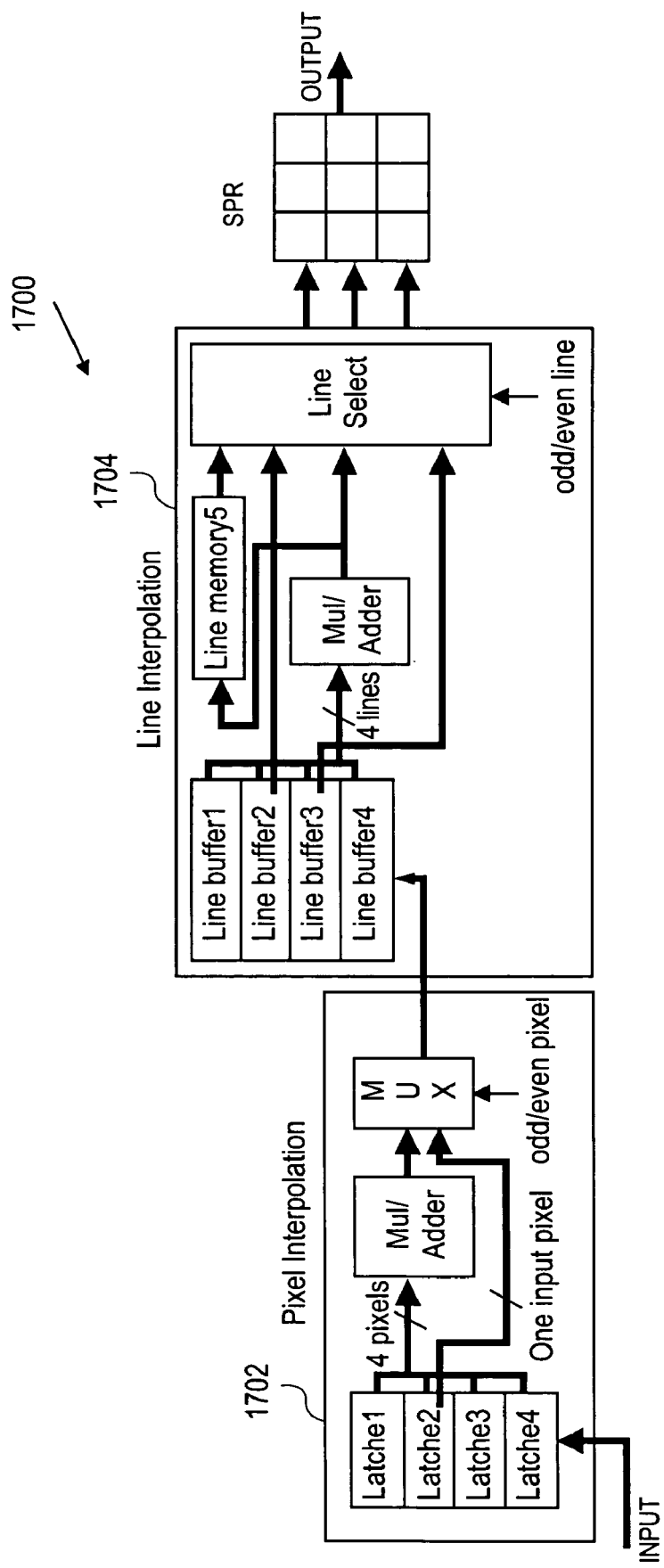
FIGS. 17 and 18 show two embodiments of similar architectures, one that supports interpolation exclusively and another that supports interpolation and duplication modes.
Figure 18:
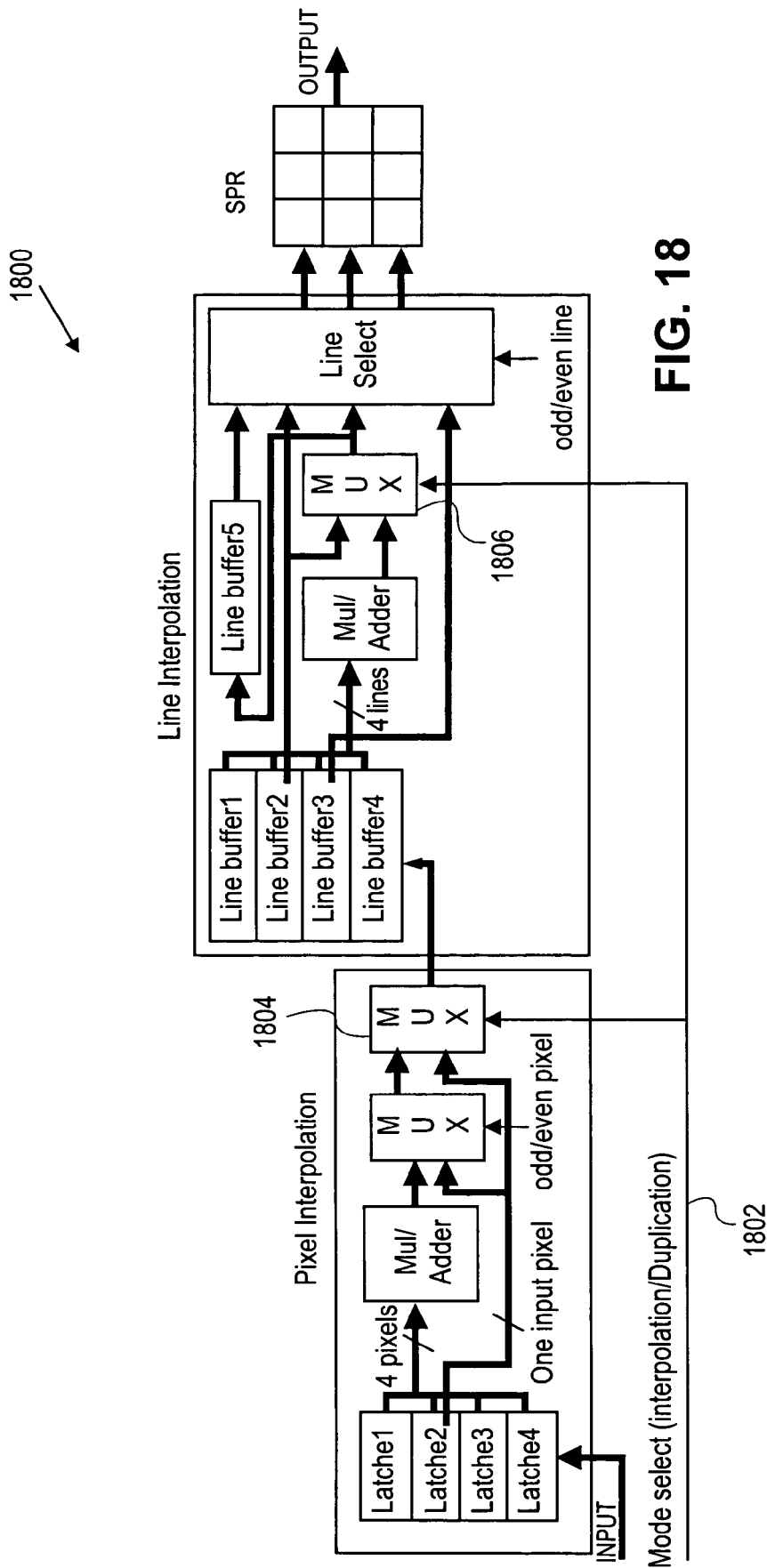

FIGS. 17 and 18 depict how to migrate from a strictly interpolation block 1700 having a pixel interpolation unit 1702 and a line interpolation unit 1704 into a dual interpolation/duplication block 1800. Dual mode block 1800 has similar pixel interpolation and line interpolation blocks as in FIG. 17; but with the addition of two Muxs 1804 and 1806. These two Muxs are supplied a mode select signal that selects either the interpolation or the duplication mode.

Figure 19:
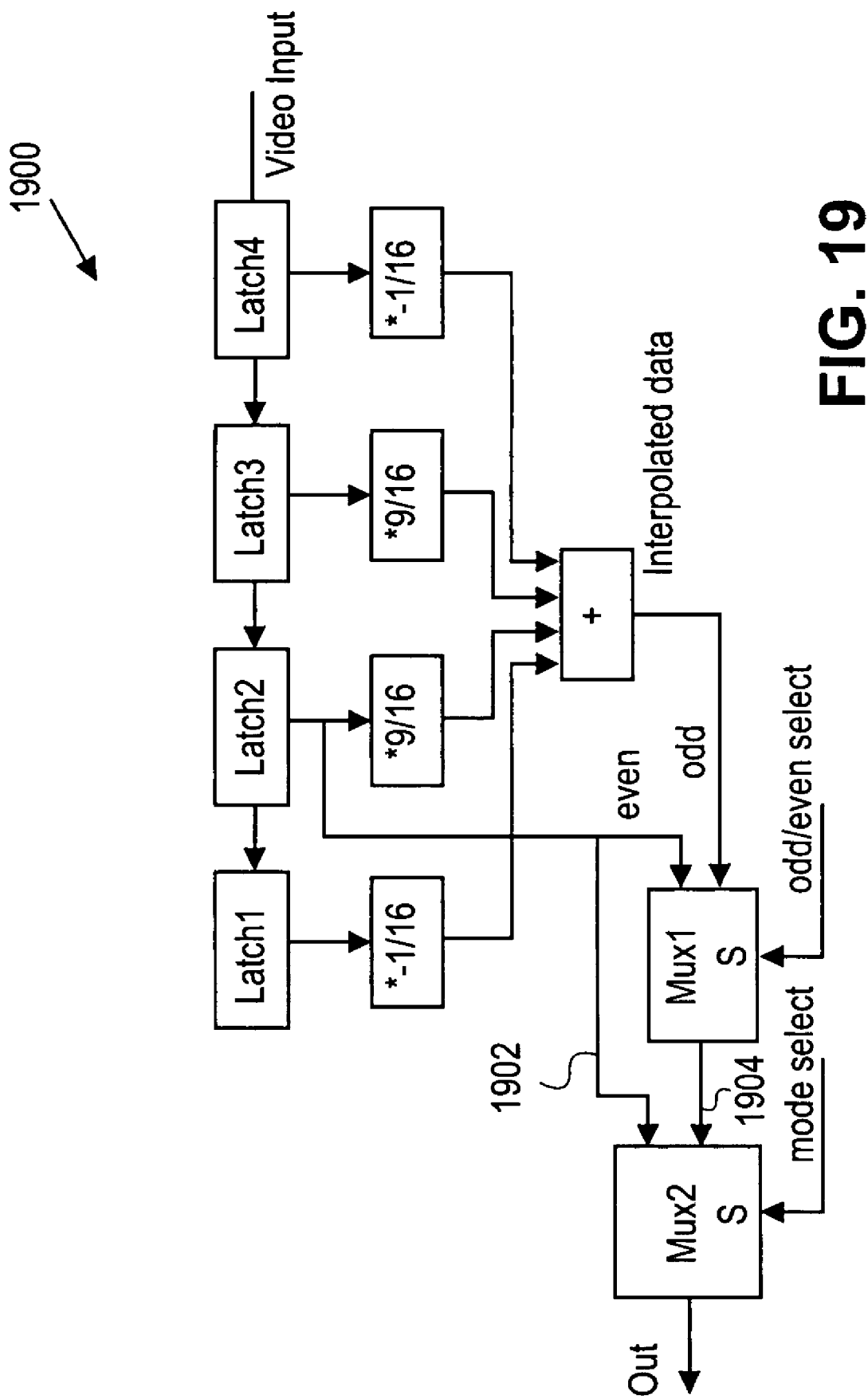
FIGS. 19 and 20 show another embodiment of a interpolation/duplication block and one possible signal diagram respectively.
Figure 20:
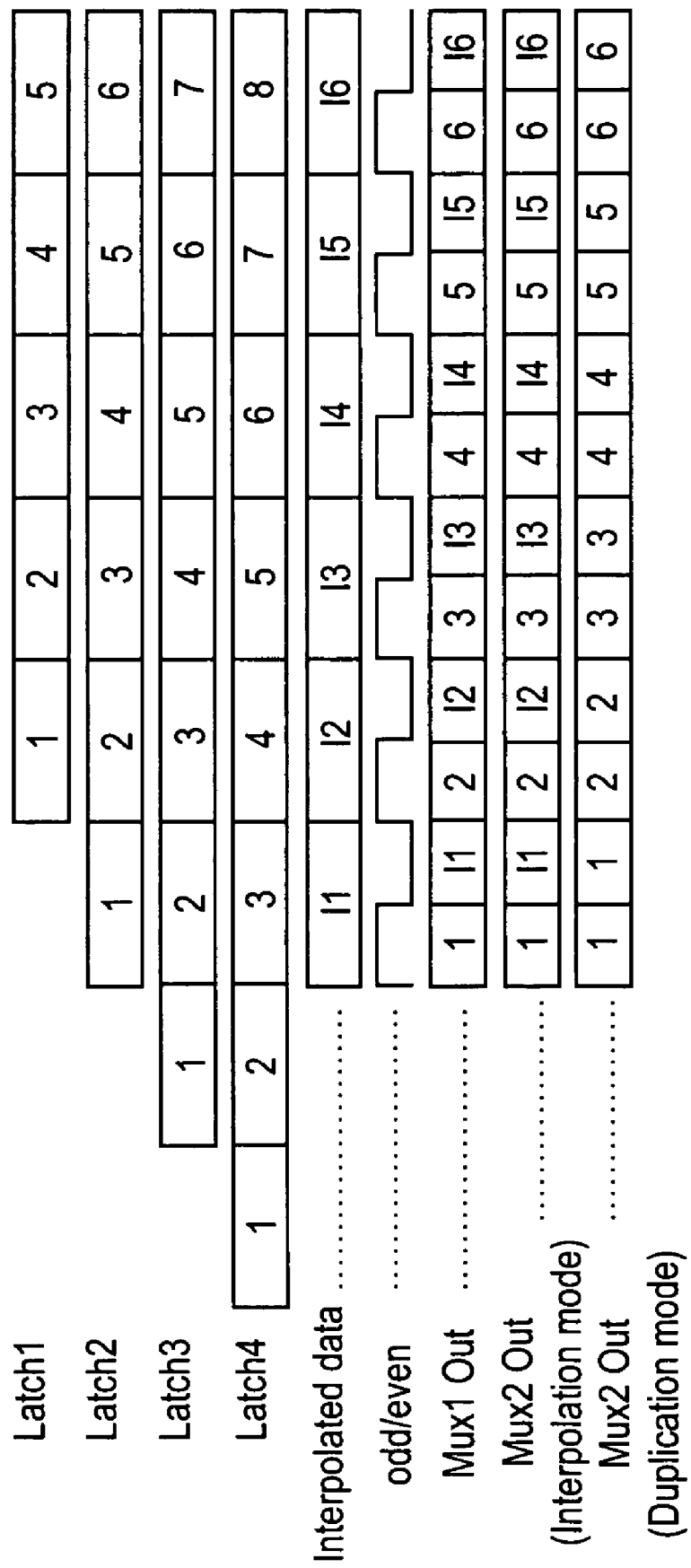
Figure 21:
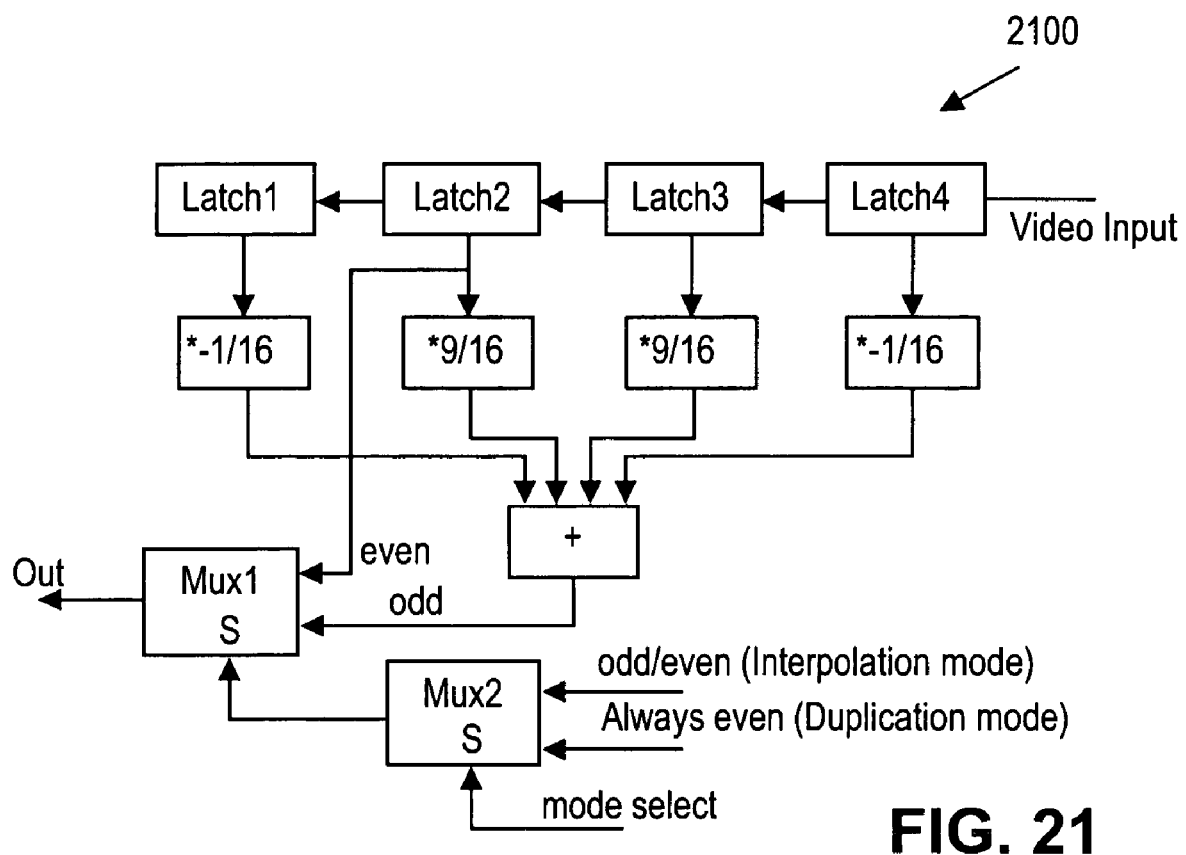
FIGS. 21 and 22 show yet another embodiment of a interpolation/duplication block and one possible signal diagram respectively.
Figure 22:
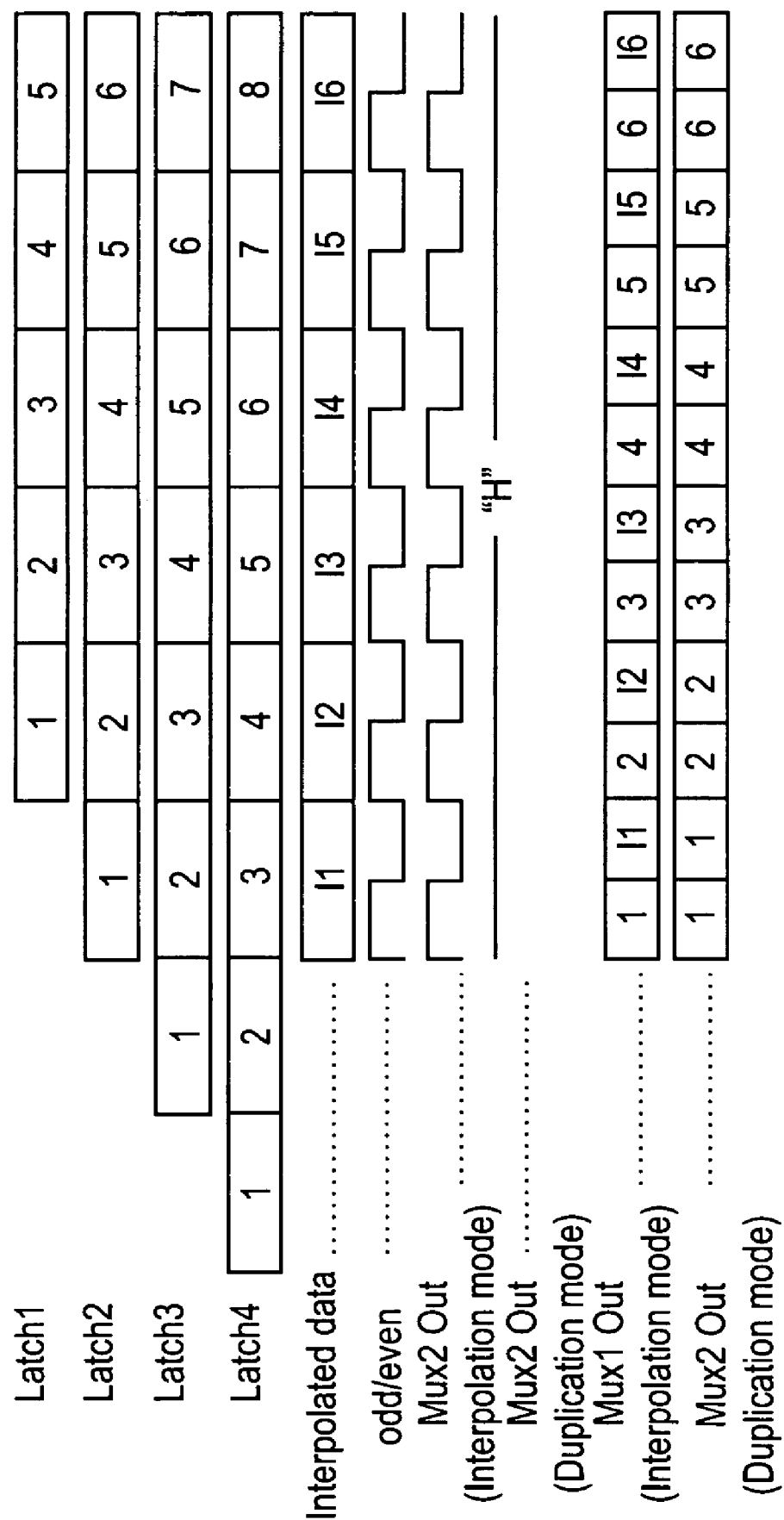

FIGS. 19 and 20 show one embodiment of a pixel interpolation block of FIG. 18. As shown, video data is input into a plurality of latches and subsequently sent to multipliers/adder to effect interpolation. Bypass 1902 is used, however, to effect pixel doubling via Mux 2 upon an appropriate mode select signal. FIG. 20 shows one possible signal timing diagram for the embodiment of FIG. 19. FIGS. 21 and 22 shows an alternative embodiment of the pixel interpolation block with its associated timing diagram.

Figure 23:
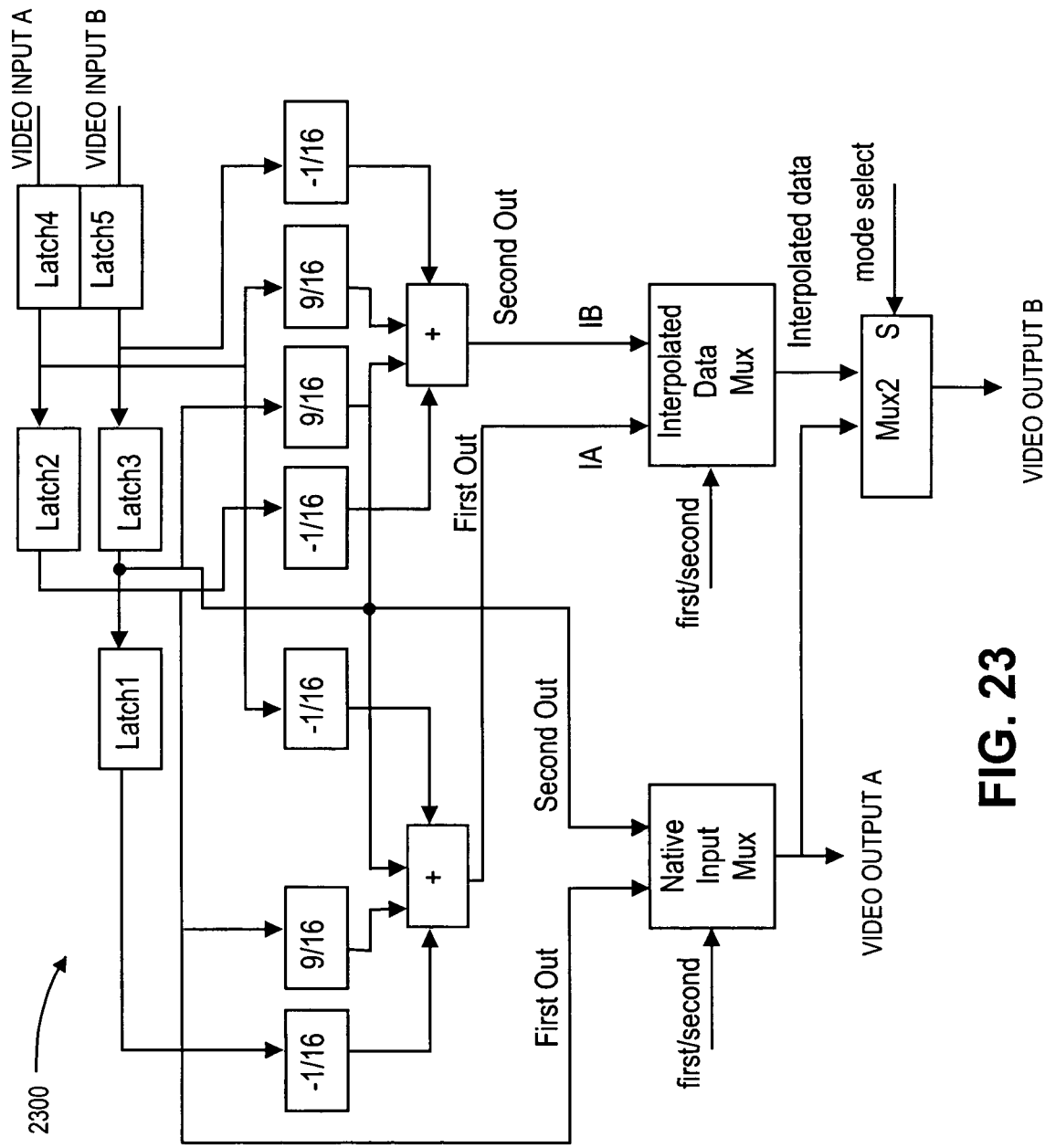
Figure 24:
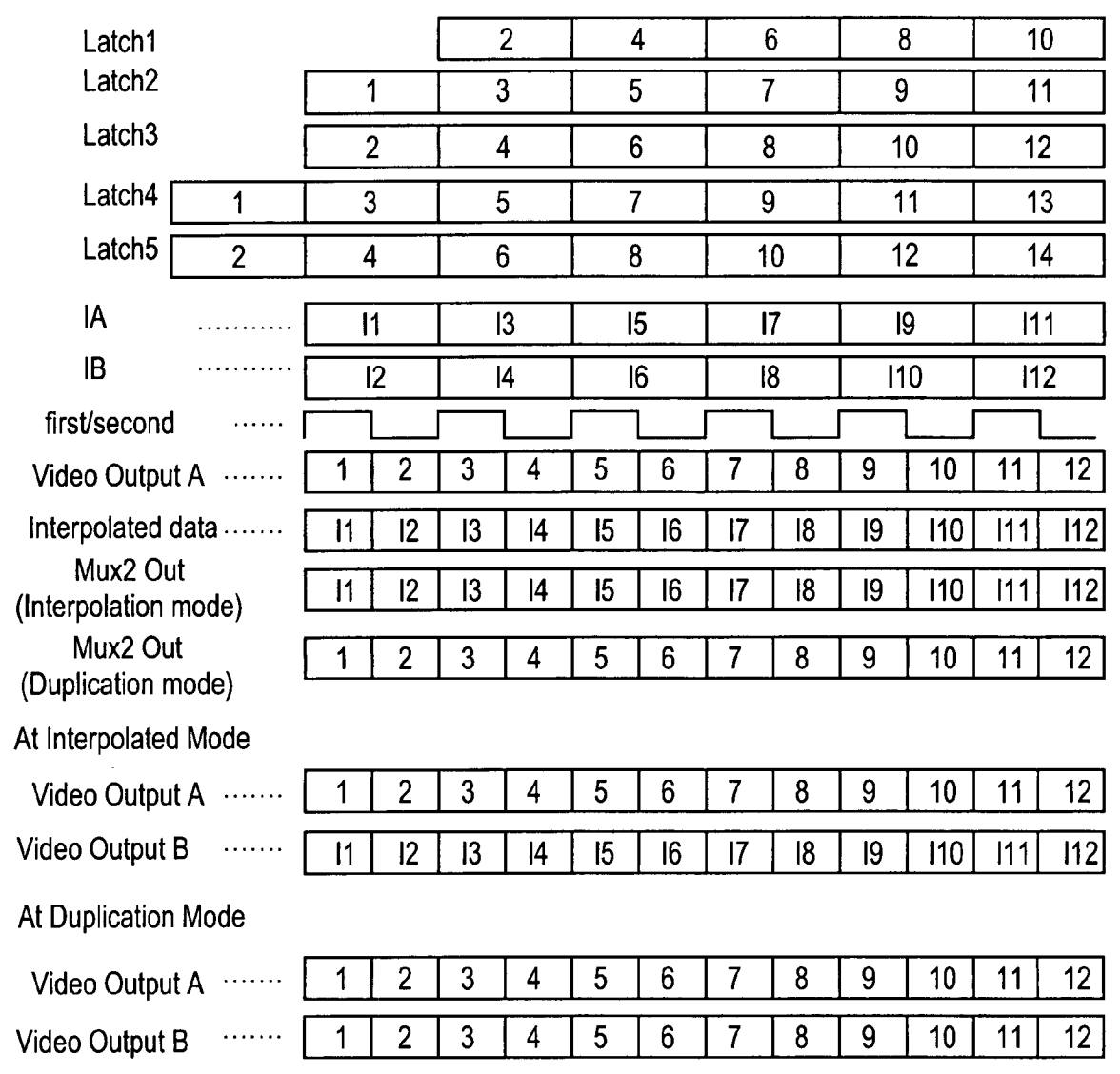

FIGS. 23 and 24 depict one embodiment of a two-channel input pixel interpolation block 2300. Video Output A is a bypass mode to allow for native input data to bypass the processing in block 2300. Video Output B is an output selected by Mux2 depending upon a mode select signal. It should be noted that there are opportunities to efficiently design block 2300 to remove the need of a multiplier, as seen in FIG. 23. FIG. 24 shows a possible timing diagram of the block of FIG. 23.

Figure 25:
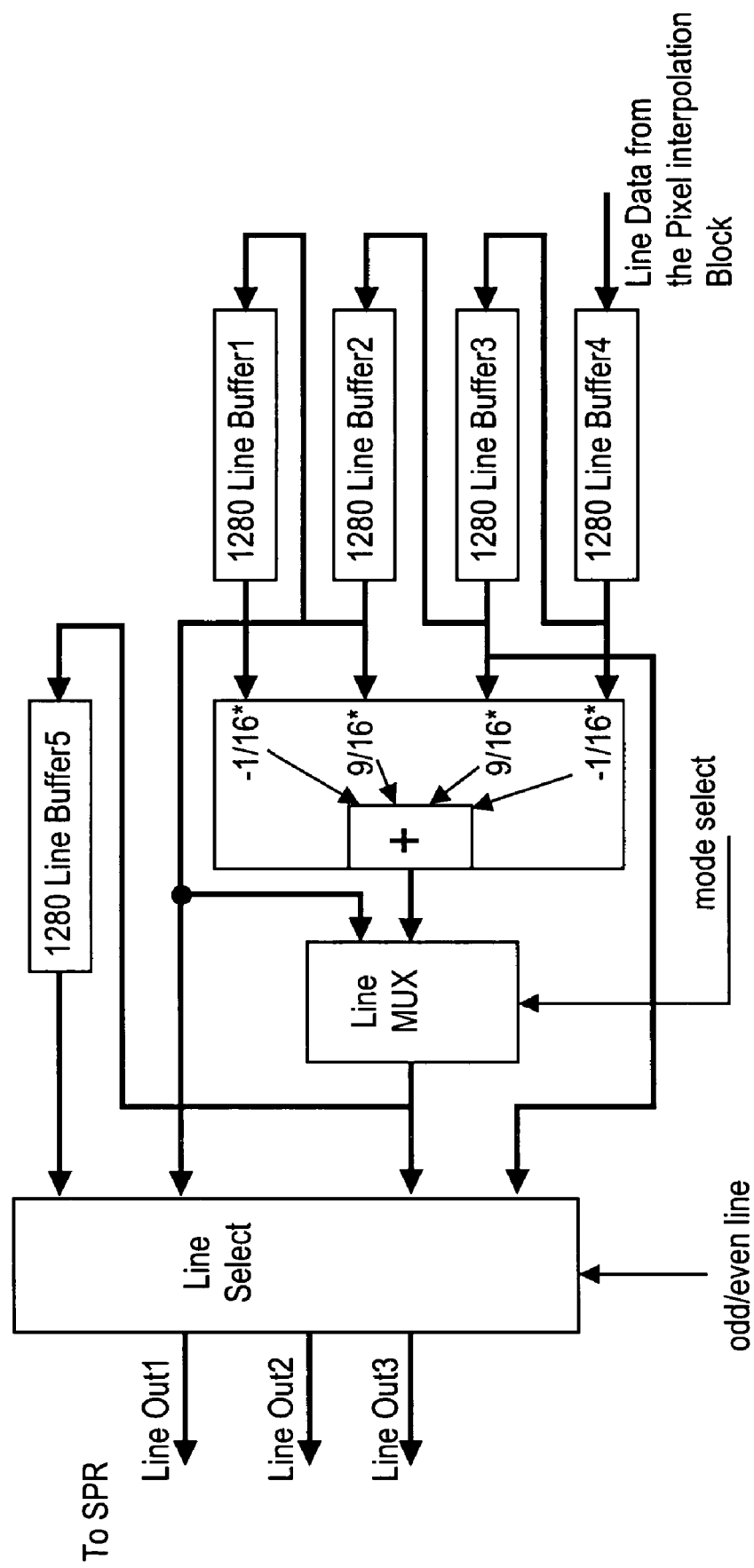
FIGS. 25, 26 and 27 show one embodiment of a line interpolation/duplication block and timing diagrams for its interpolation mode and its duplication mode respectively.
Figure 26:
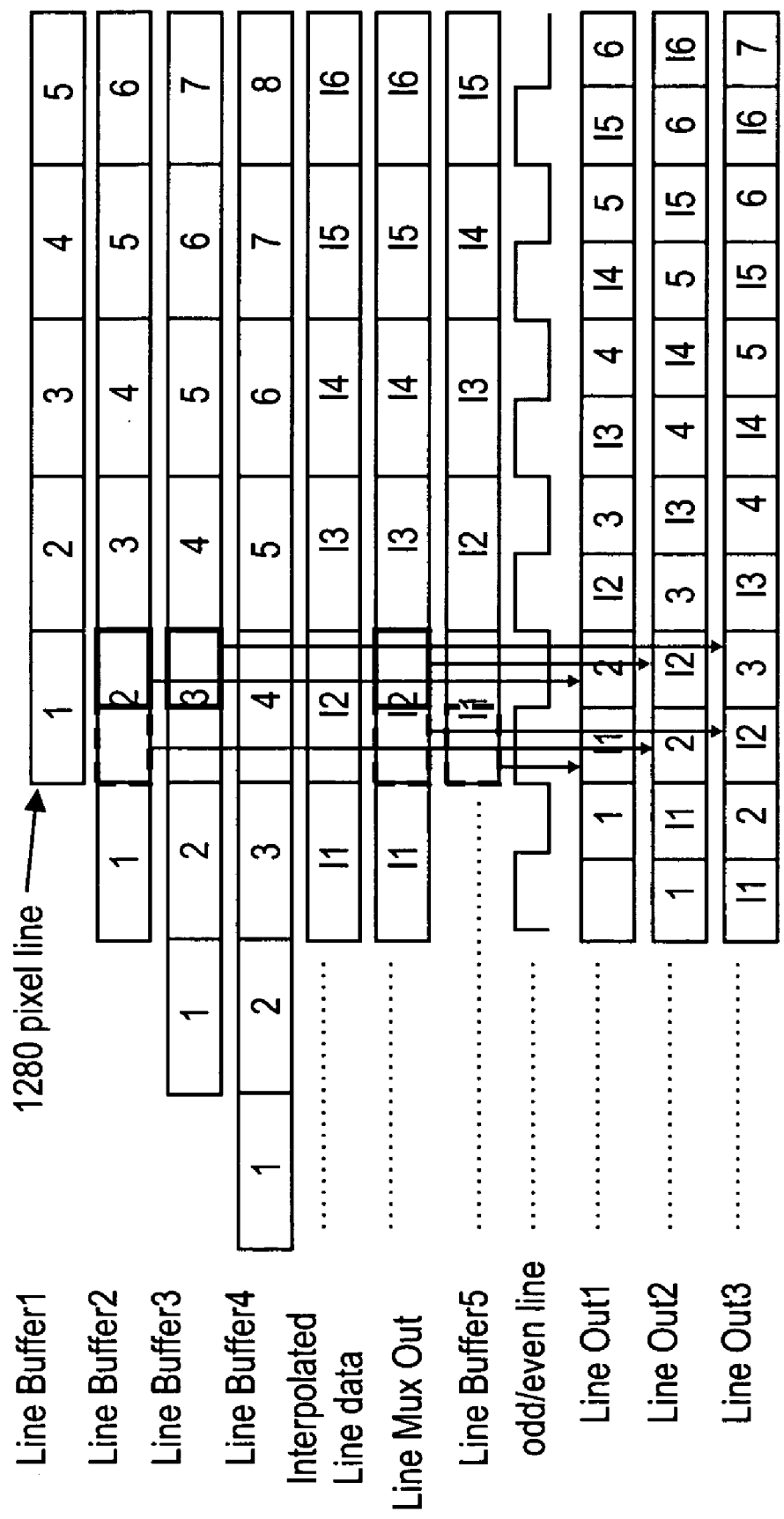
Figure 27:
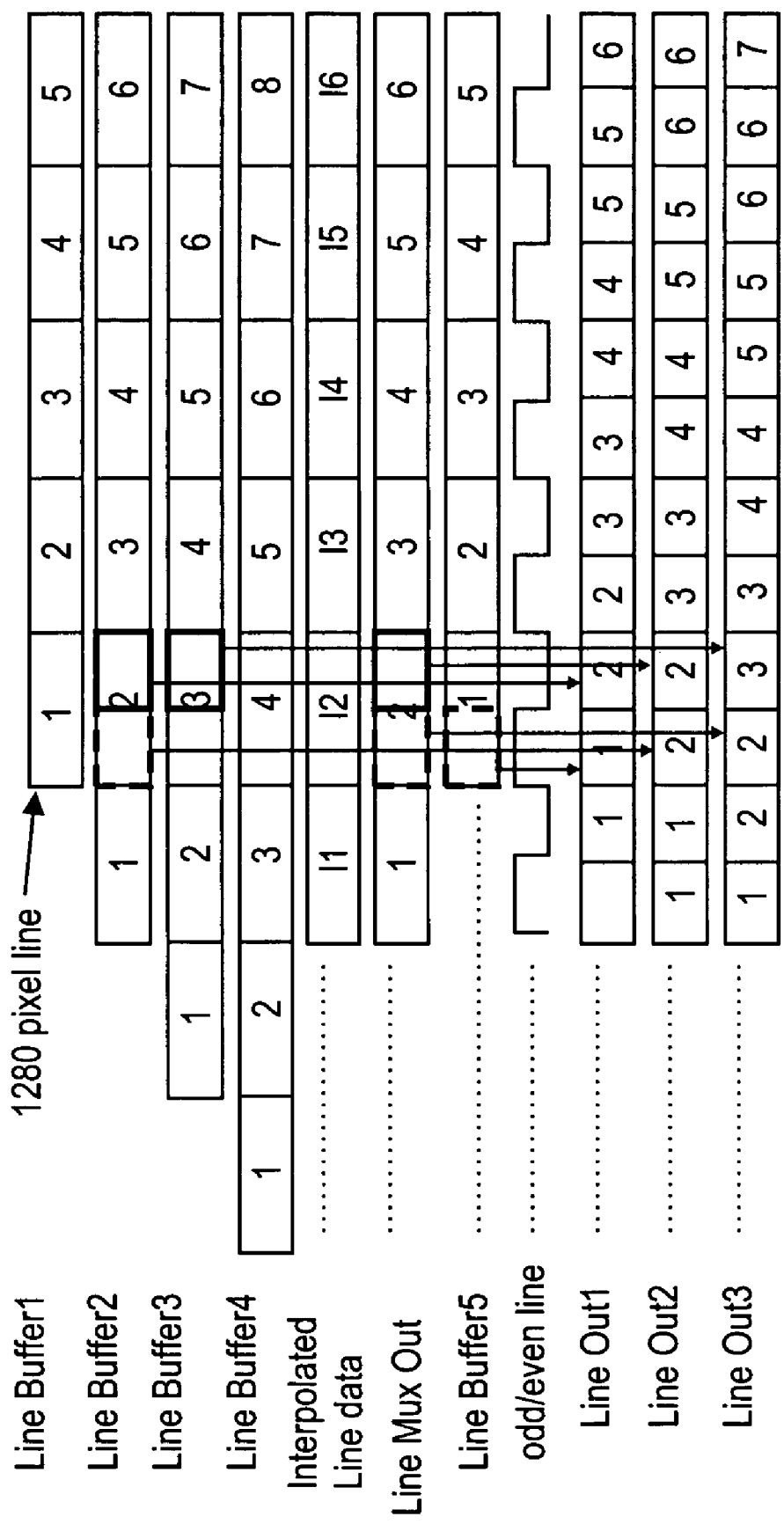

FIGS. 25, 26 and 27 depict one embodiment of a line interpolation block, with timing diagrams for interpolation mode and duplication mode respectively. As may be seen from FIG. 25, Line Mux selects either interpolated lines or duplicated lines depending upon its mode select signal. The timing diagrams of FIGS. 26 and 27 show the respective operations of this block. The Line Select operation is as follows: during odd line, Line Out1 is Line Buffer5 output, Line Out2 is Line buffer2 output, and Line Out3 is Line MUX output; during even line, Line Out1 is Line buffer2 output, Line Out2 is Line MUX output, and Line Out3 is Line buffer3 output.

Figure 28:
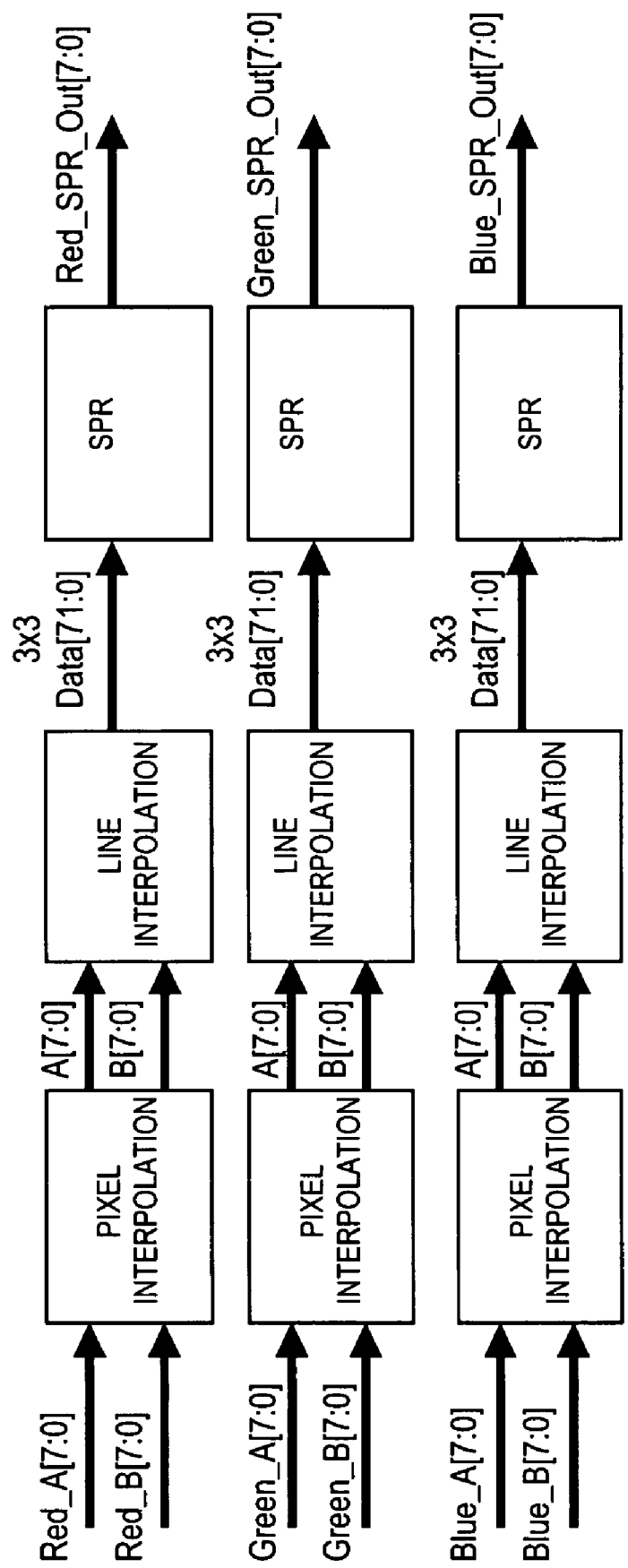
FIGS. 28 and 29 show two embodiments of a two-channel input interpolation block, one that performs same color sharpening subpixel rendering and one that performs cross-color sharpening respectively.
Figure 29:
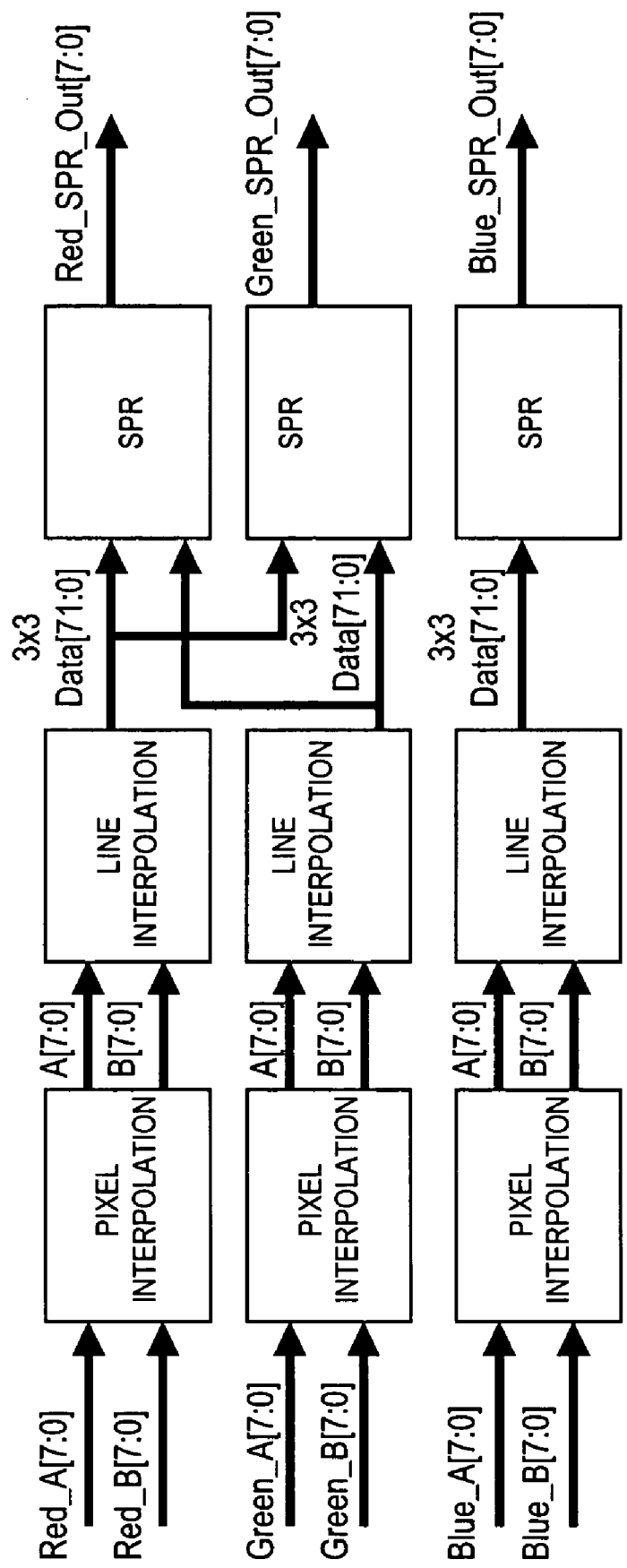

FIGS. 28 and 29 are two embodiments of a two-channel input interpolation block, one that may perform same color sharpening subpixel rendering (SPR) and one that may perform cross-color sharpening SPR, respectively. In FIG. 29, red and green image data are provided to red SPR and green SPR units together to perform the cross-color sharpening subpixel rendering.

Figure 30:
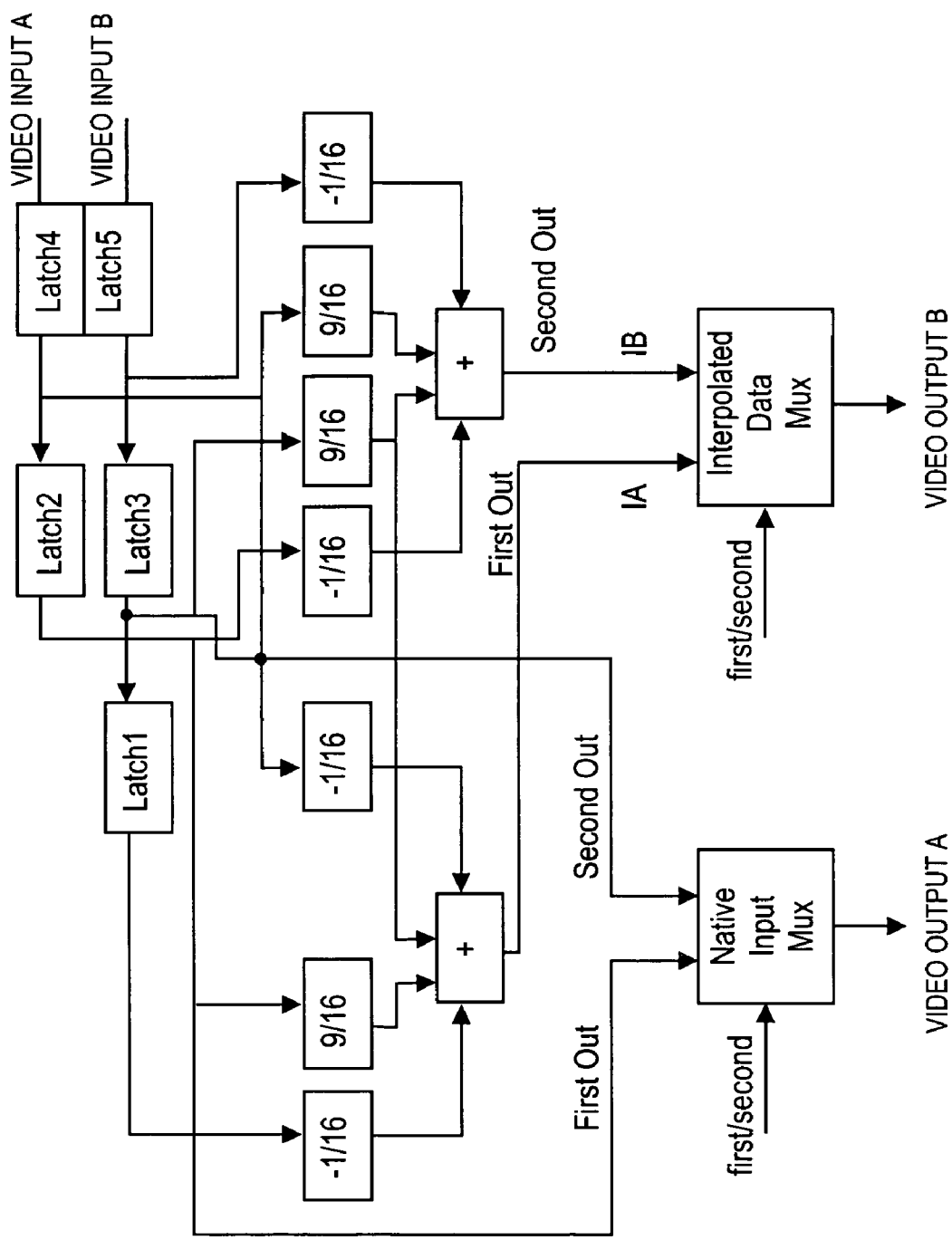
FIGS. 30 and 31 show one embodiment of a two-channel input interpolation block and a possible timing diagram respectively.
Figure 31:
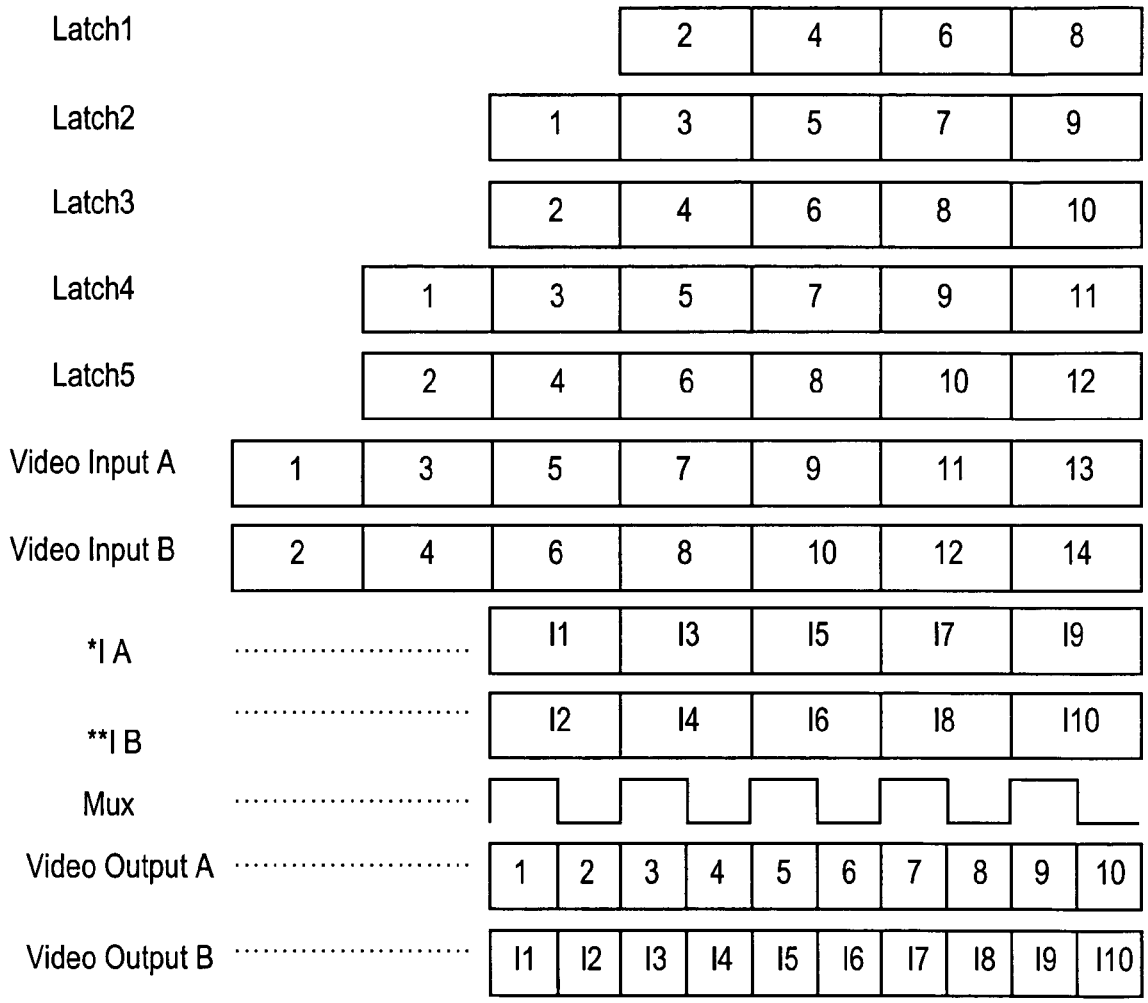
Figure 32:
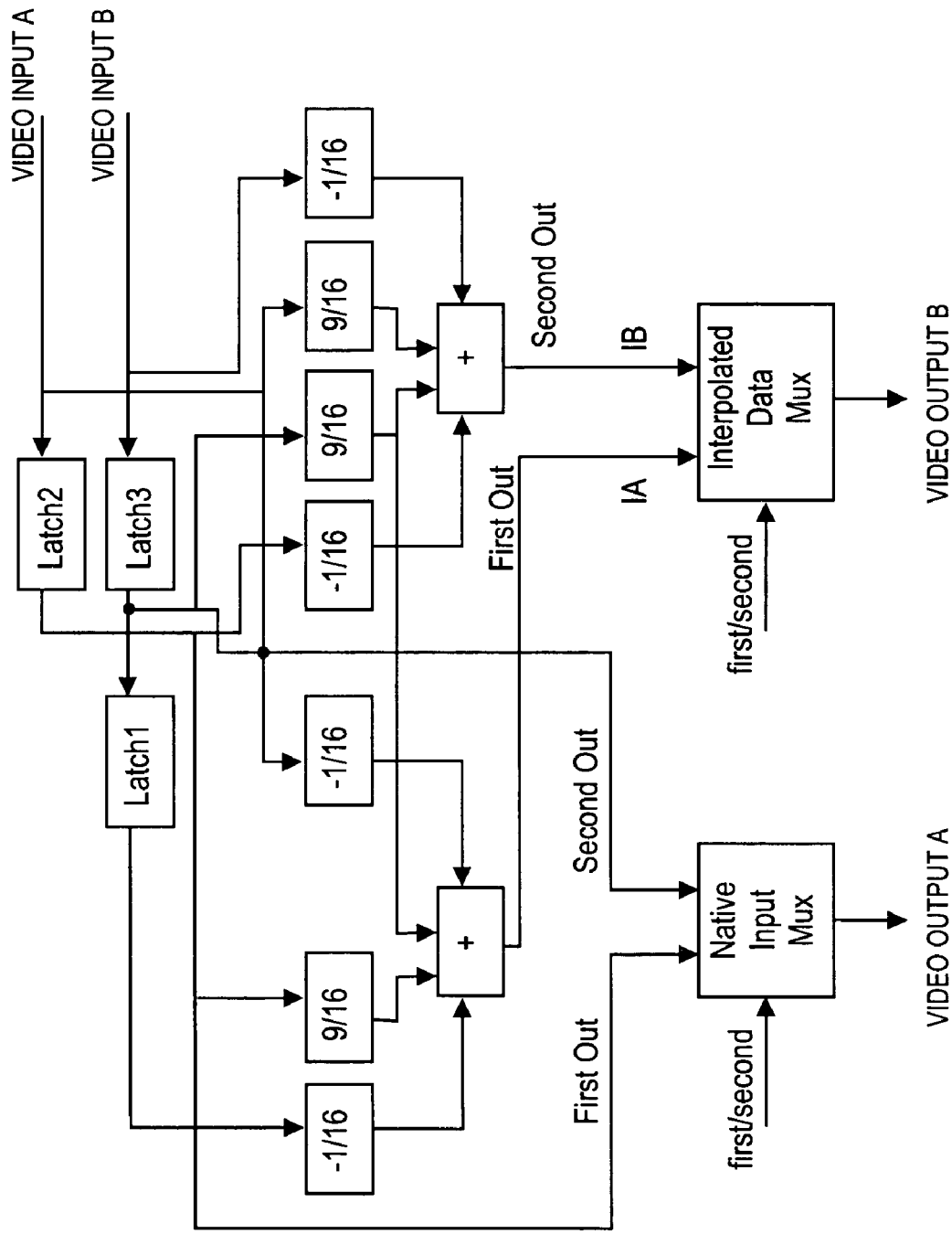
FIGS. 32 and 33 show yet another embodiment of a two-channel input interpolation block and a possible timing diagram respectively.
Figure 33:
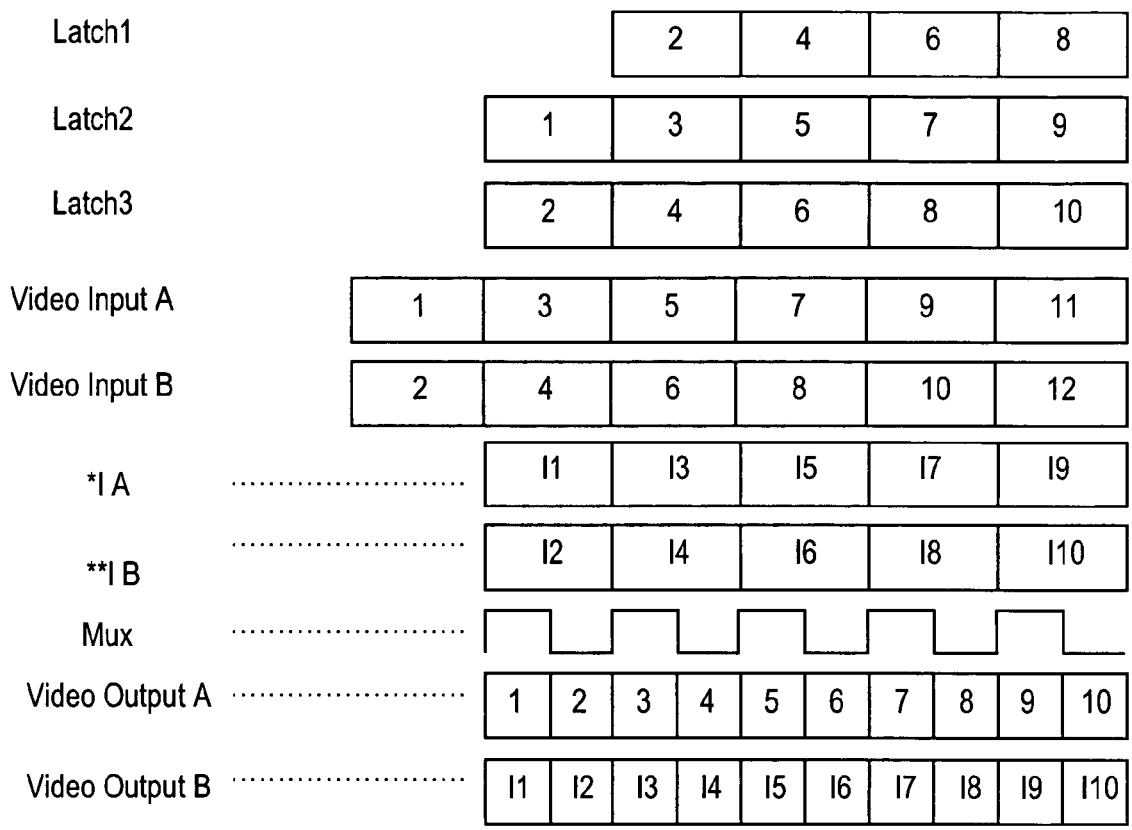

FIG. 30 shows one embodiment of a two-channel input interpolation block. As may be seen in FIG. 30, five input pixels input data into two interpolation units (i.e. multipliers and adder) and two outputs—Video Output A and B—are presented. As may be seen in one possible timing diagram of FIG. 30, Video Output A outputs the native mode input data while Video Output B outputs the interpolated data FIG. 32 shows yet another embodiment of a two-channel input interpolation block. As may be seen, the embodiment of FIG. 32 uses only three data latches, as opposed to five data latches used in FIG. 30. FIG. 33 shows a possible timing diagram of the block shown in FIG. 32.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An image processing system comprising:
   an input that receives a plurality of source image data, said plurality of source image data further comprising a plurality of source image data formats;
   circuitry that resamples source image data from said source image data format to a plurality of target image data formats;
   a display that renders target image data wherein the resolution of the display comprises approximately one half resolution of the largest of said plurality of target image data formats;
   wherein said circuitry further comprises rendering circuitry that performs subpixel rendering of said source image data.

2. The image processing system of claim 1 wherein said rendering circuitry further comprises:
   resampling circuitry that area resamples said source image data.

3. The image processing system of claim 1 wherein said rendering circuitry further comprises:
   selection circuitry that selects one of a plurality of filter kernels; and
   selection rendering circuitry that performs subpixel rendering upon said source image data according to the selected filter kernel.

4. An image processing system comprising:
   an input that receives a plurality of source image data, said plurality of source image data further comprising a plurality of source image data formats;
   circuitry that resamples source image data from said source image data format to a plurality of target image data formats;
   a display that renders target image data wherein the resolution of the display comprises approximately one half resolution of the largest of said plurality of target image data formats;
   detection circuitry that detects the resolution of the source image data;
   resampling circuitry that resamples said source image data depending upon the detected resolution of the source image data; and
   section circuitry that selects filter kernels for subpixel rendering said source image data.

5. The image processing system of claim 4, said resampling circuitry for performing resampling of source image data further comprising one of a group, said group comprising circuitry for cubic interpolation, bicubic interpolation, sync, and windowed sync functions.

6. A method for rendering a target image data, the steps of said method comprising:
   inputting a plurality of source image data, said plurality of source image data further comprising a plurality of source image data formats;
   resampling source image data from said source image data format to a plurality of target image data formats;
   rendering target image data onto a display wherein the resolution of the display comprises approximately one half of resolution of the largest of said plurality of target image data formats; and
   wherein said step of resampling source image data further comprises performing subpixel rendering of said source image data.

7. The method of claim 6 wherein said step of performing subpixel rendering of said source image data further comprises performing area resampling of said source image data.

8. The method of claim 6, wherein said step of performing subpixel rendering of said source image data further comprises:
   selecting one of a plurality of filter kernels;
   performing subpixel rendering upon said source image data according to the selected filter kernel.

9. A method for rendering a target image data, the steps of said method comprising:
   inputting a plurality of source image data, said plurality of source image data further comprising a plurality of source image data formats;
   resampling source image data from said source image data format to a plurality of target image data formats;
   rendering target image data onto a display wherein the resolution of the display comprises approximately one half of resolution of the largest of said plurality of target image data formats;
   detecting the resolution of the source image data;

resampling said source image data depending upon the detected resolution of the source image data; and selecting filter kernels for subpixel rendering said source image data.

10. An image processing system, comprising:

means for inputting a plurality of source image data, said plurality of source image data further comprising a plurality of source image data formats;

means for resampling source image data from said source image data format to a plurality of target image data formats;

means for rendering target image data onto a display wherein the resolution of the display comprises approximately one half of resolution of the largest of said plurality of target image data formats; and wherein said means for resampling source image data further comprises means for performing subpixel rendering of said source image data.

11. The image processing system of claim 10 wherein said means for performing subpixel rendering of said source image data further comprises performing area resampling of said source image data.

12. The image processing system of claim 10 wherein said means for performing subpixel rendering of said source image data further comprises:

means for selecting one of a plurality of filter kernels;

means for performing subpixel rendering upon said source image data according to the selected filter kernel.

13. An image processing system, comprising:

means for inputting a plurality of source image data, said plurality of source image data further comprising a plurality of source image data formats;

means for resampling source image data from said source image data format to a plurality of target image data formats;

means for rendering target image data onto a display wherein the resolution of the display comprises approximately one half of resolution of the largest of said plurality of target image data formats;

means for detecting the resolution of the source image data;

means for resampling said source image data depending upon the detected resolution of the source image data; and means for selecting filter kernels for subpixel rendering said source image data.

* * * * *